United States Patent
Nagano et al.

(10) Patent No.: US 9,456,118 B2
(45) Date of Patent: Sep. 27, 2016

(54) IMAGE CAPTURING APPARATUS, IMAGE PROCESSING APPARATUS, AND IMAGE PROCESSING METHOD FOR GENERATING AUXILIARY INFORMATION FOR CAPTURED IMAGE

(75) Inventors: Akihiko Nagano, Ichihara (JP); Hidenobu Akiyoshi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/564,850

(22) Filed: Aug. 2, 2012

(65) Prior Publication Data
US 2013/0044234 A1 Feb. 21, 2013

(30) Foreign Application Priority Data

Aug. 19, 2011 (JP) .................................. 2011-179909
Jan. 13, 2012 (JP) .................................. 2012-005667
Jul. 19, 2012 (JP) .................................. 2012-160943

(51) Int. Cl.
*H04N 5/228* (2006.01)
*H04N 5/232* (2006.01)

(52) U.S. Cl.
CPC .................................. *H04N 5/23212* (2013.01)

(58) Field of Classification Search
CPC .................................. H04N 5/23212
USPC .................................. 348/231.3, 345, 222.1
See application file for complete search history.

(56) References Cited

U.S. PATENT DOCUMENTS

| 8,400,555 B1* | 3/2013 | Georgiev et al. | 348/345 |
| 8,619,177 B2* | 12/2013 | Perwass et al. | 348/340 |
| 8,760,566 B2* | 6/2014 | Pitts | H04N 5/23212 348/345 |
| 8,937,677 B2* | 1/2015 | Lee | H04N 5/222 348/333.1 |
| 2002/0080261 A1* | 6/2002 | Kitamura | H04N 5/232 348/349 |
| 2004/0008258 A1* | 1/2004 | Aas | G06K 9/00288 348/207.1 |
| 2007/0070200 A1* | 3/2007 | Matusik | H04N 5/272 348/159 |
| 2007/0268121 A1* | 11/2007 | Vasefi et al. | 340/506 |
| 2008/0007626 A1* | 1/2008 | Wernersson | G03B 13/26 348/211.9 |

(Continued)

FOREIGN PATENT DOCUMENTS

| CN | 101241235 A | 8/2008 |
| CN | 101656835 A | 2/2010 |

(Continued)

OTHER PUBLICATIONS

Korean Office Action issued in corresponding application No. 10-2012-0088198 on Aug. 29, 2014.

(Continued)

*Primary Examiner* — Amy Hsu
(74) *Attorney, Agent, or Firm* — Carter, DeLuca, Farrell & Schmidt, LLP

(57) ABSTRACT

An image capturing apparatus is provided. The apparatus comprises an imaging lens, an image sensor, and a plurality of microlenses. The apparatus also comprises an image processing unit configured to generate a reconstruction image at a predetermined refocus plane by performing refocus processing on the image data that was output from the image sensor, and determine whether or not a subject appears in the reconstruction image. The recording unit of the apparatus records the image data that was output from the image sensor and record information regarding the subject that was determined to appear by the image processing unit as auxiliary information in association with the image data.

36 Claims, 20 Drawing Sheets

(56) References Cited

U.S. PATENT DOCUMENTS

| | | | |
|---|---|---|---|
| 2008/0193026 A1* | 8/2008 | Horie | H04N 5/23293 382/238 |
| 2009/0009598 A1* | 1/2009 | Sotodate | 348/143 |
| 2009/0027515 A1* | 1/2009 | Maruyama | H04N 5/23293 348/223.1 |
| 2009/0190024 A1* | 7/2009 | Hayasaka | H01L 27/14627 348/360 |
| 2010/0085468 A1* | 4/2010 | Park | H04N 5/23296 348/345 |
| 2010/0129048 A1* | 5/2010 | Pitts | H04N 5/23212 386/278 |
| 2010/0134642 A1* | 6/2010 | Thorn | G02B 7/287 348/222.1 |
| 2010/0141802 A1* | 6/2010 | Knight | H04N 5/225 348/240.3 |
| 2010/0188522 A1 | 7/2010 | Ohnishi et al. | |
| 2010/0265381 A1* | 10/2010 | Yamamoto | G02B 27/0025 348/335 |
| 2010/0265385 A1* | 10/2010 | Knight | H04N 5/232 348/340 |
| 2011/0043655 A1* | 2/2011 | Park | H04N 5/23212 348/222.1 |
| 2011/0216153 A1* | 9/2011 | Tasker | H04N 7/147 348/14.02 |
| 2011/0298961 A1* | 12/2011 | Yoshida | G03B 13/36 348/333.01 |
| 2012/0019703 A1* | 1/2012 | Thorn | G06T 5/002 348/333.03 |
| 2012/0092515 A1* | 4/2012 | Yim | G06F 17/30247 348/222.1 |
| 2012/0140038 A1* | 6/2012 | Bi et al. | 348/46 |
| 2012/0300041 A1* | 11/2012 | Hamashima | G03B 35/08 348/49 |

FOREIGN PATENT DOCUMENTS

| | | |
|---|---|---|
| JP | 2-264632 A | 10/1990 |
| JP | 2963990 B | 10/1999 |
| JP | 2000-020691 A | 1/2000 |
| JP | 2002-251380 A | 9/2002 |
| JP | 2004215091 A | 7/2004 |
| JP | 2006-165822 A | 6/2006 |
| JP | 2009-065356 A | 3/2009 |
| JP | 2009224982 A | 10/2009 |
| JP | 2010-177860 A | 8/2010 |
| JP | 2010-191883 A | 9/2010 |
| KR | 20110059247 A | 6/2011 |

OTHER PUBLICATIONS

Office Action dated Sep. 24, 2014, of Chinese counterpart Application No. 201210298159.7.

Japanese Office Action issued in corresponding application No. 2012160943 on May 27, 2016.

* cited by examiner

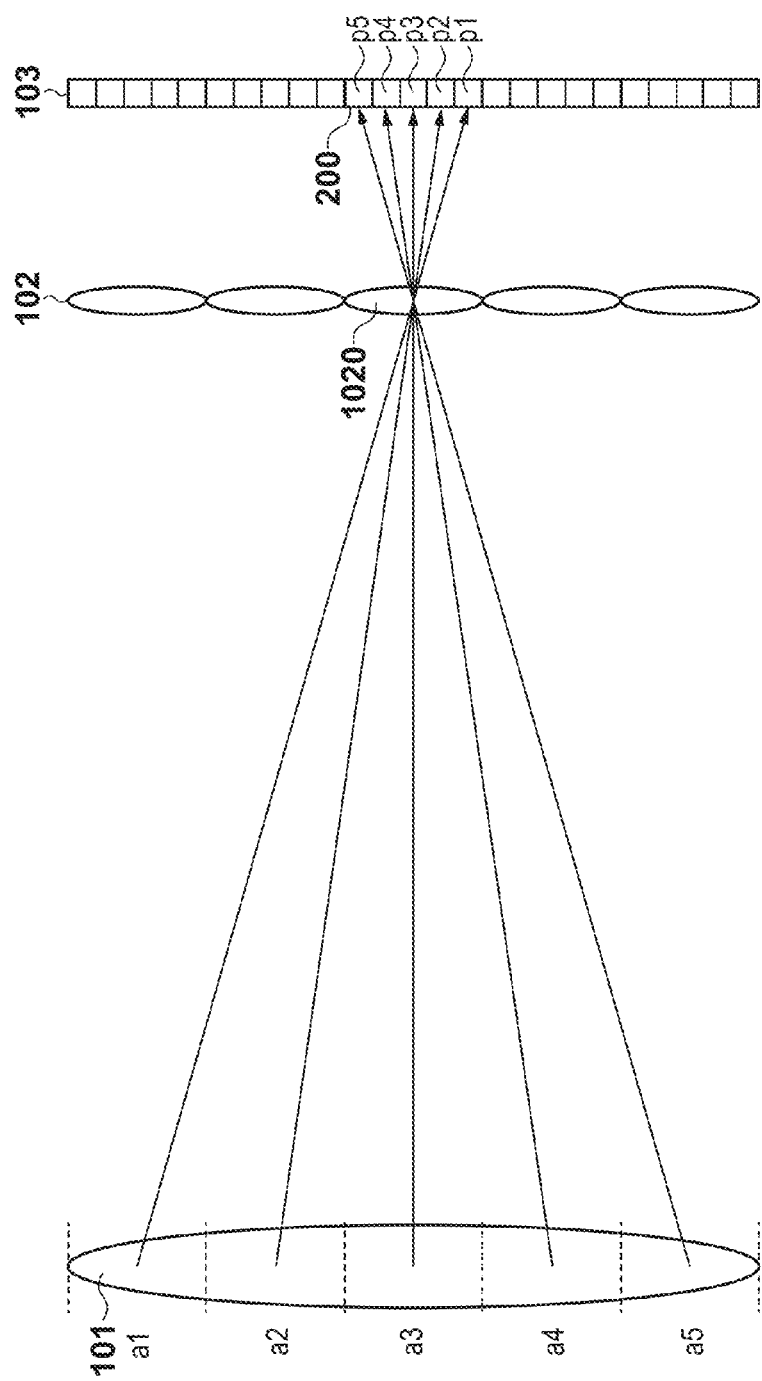

FIG. 4B

|  |  |  |  |  |
|---|---|---|---|---|
| p51 | p41 | p31 | p21 | p11 |
| p52 | p42 | p32 | p22 | p12 |
| p53 | p43 | p33 | p23 | p13 |
| p54 | p44 | p34 | p24 | p14 |
| p55 | p45 | p35 | p25 | p15 |

|  |  |  |  |  |
|---|---|---|---|---|
| a11 | a12 | a13 | a14 | a15 |
| a21 | a22 | a23 | a24 | a25 |
| a31 | a32 | a33 | a34 | a35 |
| a41 | a42 | a43 | a44 | a45 |
| a51 | a52 | a53 | a54 | a55 |

101

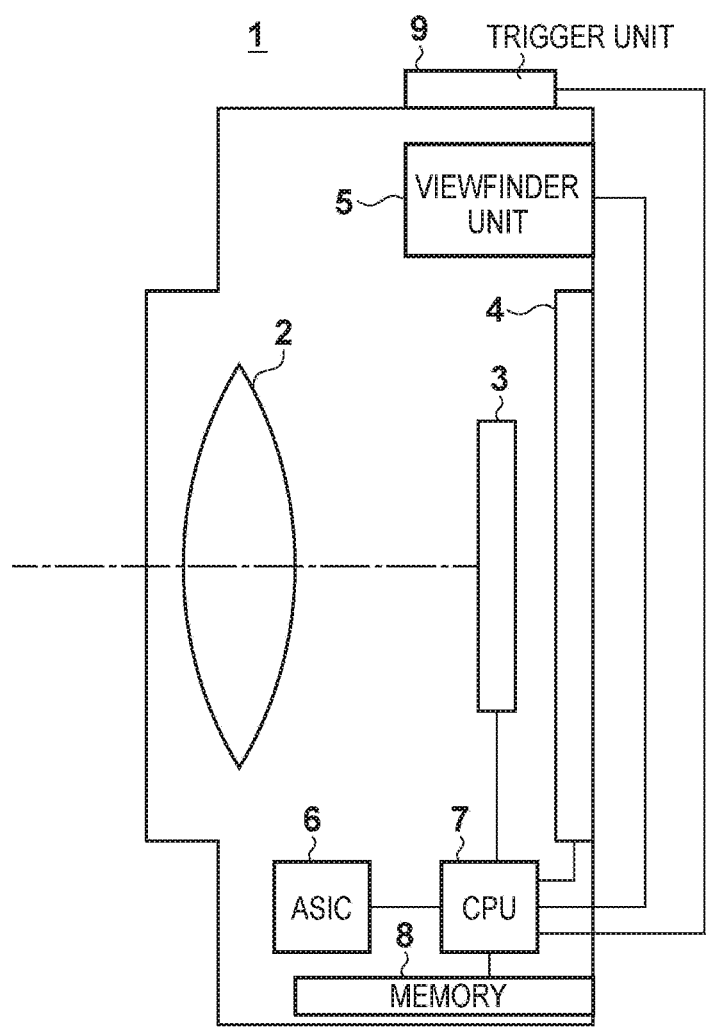

F I G. 11

| 00 | 01 | 02 | 03 | 04 | 05 | 06 | 07 | 08 | 09 |
|----|----|----|----|----|----|----|----|----|----|
| 10 | 11 | 12 | 13 | 14 | 15 | 16 | 17 | 18 | 19 |
| 20 | 21 | 22 | 23 | 24 | 25 | 26 | 27 | 28 | 29 |
| 30 | 31 | 32 | 33 | 34 | 35 | 36 | 37 | 38 | 39 |
| 40 | 41 | 42 | 43 | 44 | 45 | 46 | 47 | 48 | 49 |
| 50 | 51 | 52 | 53 | 54 | 55 | 56 | 57 | 58 | 59 |
| 60 | 61 | 62 | 63 | 64 | 65 | 66 | 67 | 68 | 69 |
| 70 | 71 | 72 | 73 | 74 | 75 | 76 | 77 | 78 | 79 |

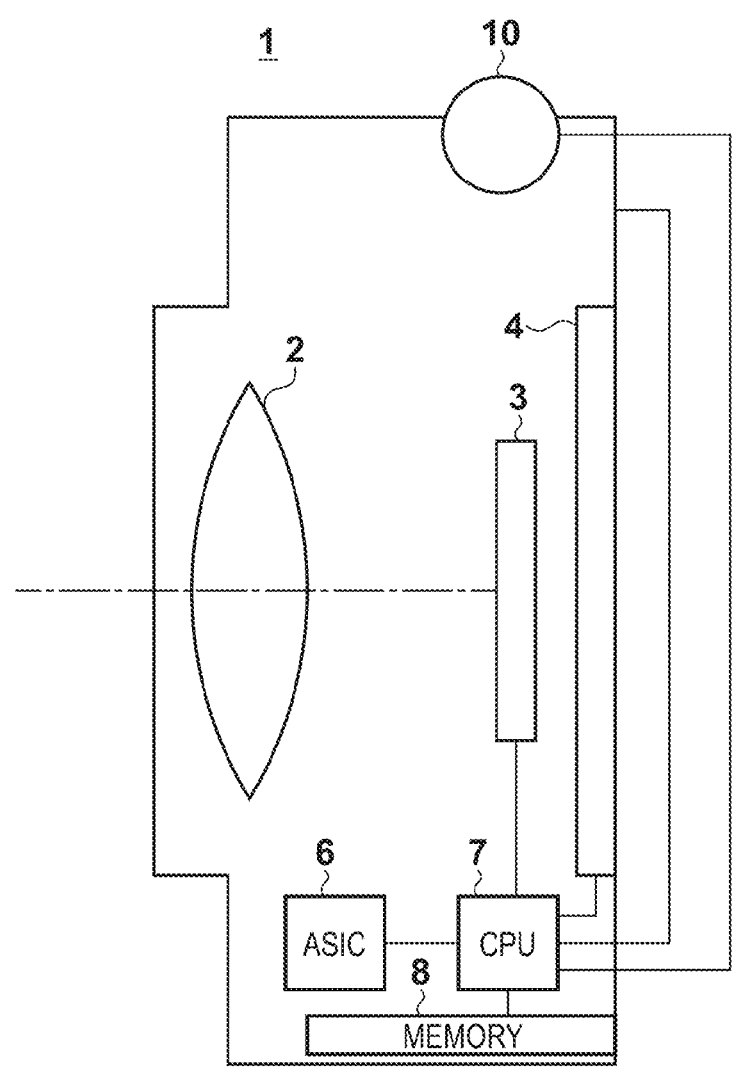

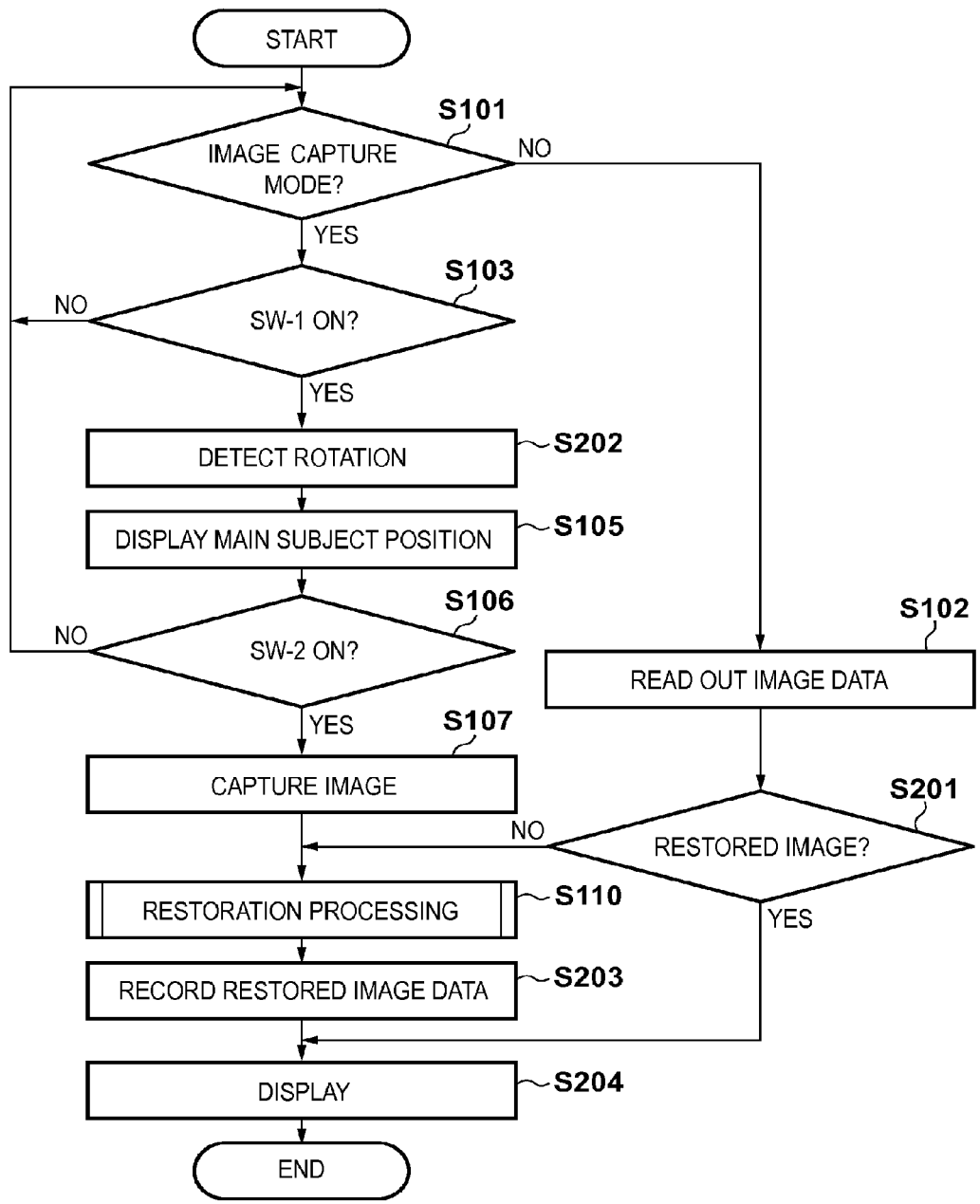

IMAGE CAPTURING APPARATUS, IMAGE PROCESSING APPARATUS, AND IMAGE PROCESSING METHOD FOR GENERATING AUXILIARY INFORMATION FOR CAPTURED IMAGE

BACKGROUND OF THE INVENTION

1. Field of the Invention

The present invention relates to an image capturing apparatus, an image processing apparatus, and an image processing method that handle image data that enables the focal length of an image to be changed after image capture.

2. Description of the Related Art

Among digital cameras, attention has been given to the field of cameras called light field cameras in recent years. With images captured by this type of camera, it is possible to create a refocused image by changing the focal length (imaging plane, refocus plane) after image capture, and thus there is expectation for the ability to select various focal positions after image capture and eliminate out-of-focus images caused by user error at the time of image capture.

Meanwhile, there is a function called index display that is used when displaying images captured by a digital camera. This is a function for displaying a list of reduced images to make it easier for the user to find an intended image. However, although images captured by a light field camera enable the focus to be placed anywhere after image capture, the focus is not necessarily placed on the person or the like that the user desires to have in focus at the time of image capture. In particular, when index display is performed, there are cases where, for example, it is not possible to determine who appears in an image if the person is not in focus, and the user has difficulty in selecting an image.

Japanese Patent Laid-Open No. 2009-065356 discloses a method for resolving the aforementioned problem in which a subject's face cannot be recognized at the time of image capture with a light field camera. In this method, a setting is set for changing the depth of field, the lens position is changed multiple times for preliminary image capture, face recognition is performed based on the results of the preliminary image capture, and then image capture is performed.

However, although Japanese Patent Laid-Open No. 2009-065356 discloses a method for performing face recognition at the time of image capture, there is no disclosure of a method for resolving the aforementioned problem at the time of image reproduction.

In view of the aforementioned problems, the present invention provides an image capturing apparatus, an image processing apparatus, and an image processing method that enable easy identification of a subject included in image data that was captured by a light field camera.

SUMMARY OF THE INVENTION

According to a first aspect of the present invention, there is provided an image capturing apparatus comprising: an imaging lens; an image sensor that is composed of a plurality of two-dimensionally arranged pixels, the image sensor being configured to perform photoelectric conversion on incident light and output image data; a plurality of microlenses that are arranged between the imaging lens and the image sensor, each microlens corresponding to respective one of a plurality of regions of the image sensor, each region being composed of a predetermined number of pixels; an image processing unit configured to generate a reconstruction image at a predetermined refocus plane by performing refocus processing on the image data that was output from the image sensor, and determine whether or not a subject appears in the reconstruction image; and a recording unit configured to record the image data that was output from the image sensor and record information regarding the subject that was determined to appear by the image processing unit as auxiliary information in association with the image data.

According to a second aspect of the present invention, there is provided an image processing apparatus for processing image data output from an image capturing apparatus comprising an imaging lens, an image sensor that is composed of a plurality of two-dimensionally arranged pixels, the image sensor being configured to perform photoelectric conversion on incident light and output image data, and a plurality of microlenses that are arranged between the imaging lens and the image sensor, each microlens corresponding to respective one of a plurality of regions of the image sensor, each region being composed of a predetermined number of pixels, the image processing apparatus comprising: an image processing unit configured to generate a reconstruction image at a predetermined refocus plane by performing refocus processing on the image data that was output from the image sensor, and determine whether or not a subject appears in the reconstruction image; and a recording unit configured to record the image data that was output from the image sensor and record information regarding the subject that was determined to appear by the image processing unit as auxiliary information in association with the image data.

According to a third aspect of the present invention, there is provided an image processing method for processing image data output from an image capturing apparatus comprising an imaging lens, an image sensor that is composed of a plurality of two-dimensionally arranged pixels, the image sensor being configured to perform photoelectric conversion on incident light and output image data, and a plurality of microlenses that are arranged between the imaging lens and the image sensor, each microlens corresponding to respective one of a plurality of regions of the image sensor, each region being composed of a predetermined number of pixels, the image processing method comprising: an image processing step of generating a reconstruction image at a predetermined refocus plane by performing refocus processing on the image data that was output from the image sensor, and determining whether or not a subject appears in the reconstruction image; and a recording step of recording the image data that was output from the image sensor and recording information regarding the subject that was determined to appear in the image processing step as auxiliary information in association with the image data.

Further features of the present invention will become apparent from the following description of exemplary embodiments with reference to the attached drawings.

BRIEF DESCRIPTION OF THE DRAWINGS

FIG. 3 is a diagram illustrating a positional relationship between an imaging lens, the pixels of the image sensor, and the microlens array according to embodiments.

FIGS. 4A and 4B are diagrams illustrating a correspondence relationship between pupil regions of the imaging lens and light-receiving pixels according to embodiments.

FIG. 10 is a diagram showing an overall configuration of a digital camera 1 according to a third embodiment.

FIG. 11 is a diagram illustrating the division of an image capture screen.

FIG. 13B is a diagram illustrating a viewfinder image in the case where the first switch is on.

FIG. 16 is a diagram showing an overall configuration of the digital camera 1 according to a fourth embodiment.

FIG. 17 is a flowchart showing image capture processing and restoration processing according to the fourth embodiment.

DESCRIPTION OF THE EMBODIMENTS

The following is a detailed description of embodiments for carrying out the present invention with reference to the accompanying drawings.

First Embodiment

Figure 1:
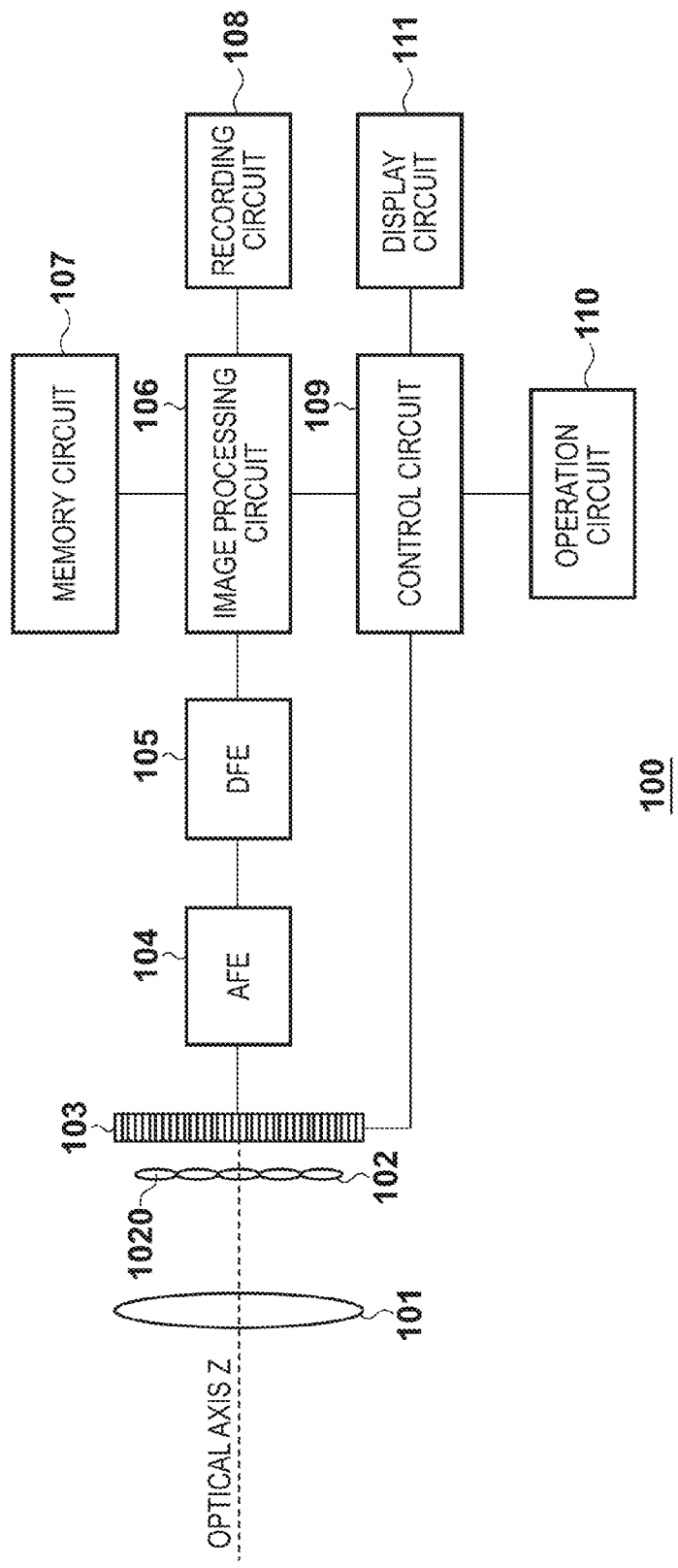
FIG. 1 is a block diagram showing an overall configuration of an image capturing apparatus according to embodiments of the present invention.

FIG. 1 is a block diagram showing an overall configuration of an image capturing apparatus 100 according to embodiments of the present invention. In the configuration shown in FIG. 1, light that has passed through an imaging lens 101 forms an image in the vicinity of the focal position of the imaging lens 101. A microlens array 102 is configured by multiple microlenses 1020, and due to being disposed in the vicinity of the focal position of the imaging lens 101, the microlens array 102 functions such that light that has passed through different pupil regions of the imaging lens 101 is divided and emitted for each pupil region. An image sensor 103 is a photoelectric conversion element such as a CMOS image sensor or a CCD image sensor, and outputs an image signal obtained by subjecting incident light to photoelectric conversion. The multiple microlenses 1020 are arranged two-dimensionally such that each microlense 1020 corresponds to a plurality of pixels, and therefore light that has been divided and emitted for each pupil region by the microlenses 1020 can be received while maintaining division information, and can be converted into an image signal that can be subjected to data processing.

An analog signal processing circuit (AFE) 104 performs correlated double sampling processing, signal amplification, reference level adjustment, A/D conversion processing, and the like on the image signal output from the image sensor 103. A digital signal processing circuit (DFE) 105 performs digital image processing such as reference level adjustment on the image signal output from the analog signal processing circuit 104.

An image processing circuit 106 subjects the image signal output from the digital signal processing circuit 105 to predetermined image processing as well as a refocusing operation (developing processing), which is unique to light field cameras, for placing the focus on an arbitrary virtual imaging plane. Furthermore, the image processing circuit 106 has a subject detection function for detecting a subject in a developed image and a recognition function for recognizing whether the detected subject is a specific subject. In the present embodiment, the image processing circuit 106 has a face determination function for identifying a person's face as an example of the subject detection, and a face recognition function for recognizing whose face was identified by collation with a face database in a later-described memory circuit 107 as an example of the subject recognition function, but there is no limitation to this. The image processing circuit 106 further has a function for, when index display is to be performed at the time of reproduction, reading out a main image from a recording circuit 108, performing developing using a predetermined refocus parameter, and generating a reduced image (thumbnail image). The memory circuit 107 is a non-volatile memory such as a flash memory, and stores face database information in which pairs of people's faces and names are stored. The recording circuit 108 is a recording medium such as a memory card that records and holds image signals (main images) output from the image processing circuit 106 and later-described auxiliary information that is associated with the main images.

A control circuit 109 performs overall drive control of the image capturing apparatus 100, such as drive control of the image sensor 103 and the image processing circuit 106. An operation circuit 110 receives signals from an operation member with which the image capturing apparatus 100 is provided and inputs user instructions to the control circuit 109. A display circuit 111 displays captured images, live-view images, various types of setting screens, main images, developed images, auxiliary information recorded in the recording circuit 108, and the like. Furthermore, in the later-described case where the auxiliary information is an image, the display circuit 111 can clip out and display part of that image. Moreover, in the case where the auxiliary information is character data, the display circuit 111 can display characters so as to be superimposed on the display screen.

Next is a description of the positional relationship between the imaging lens 101, the microlens array 102, and the image sensor 103 in the image capturing apparatus of the present embodiment.

Figure 2:
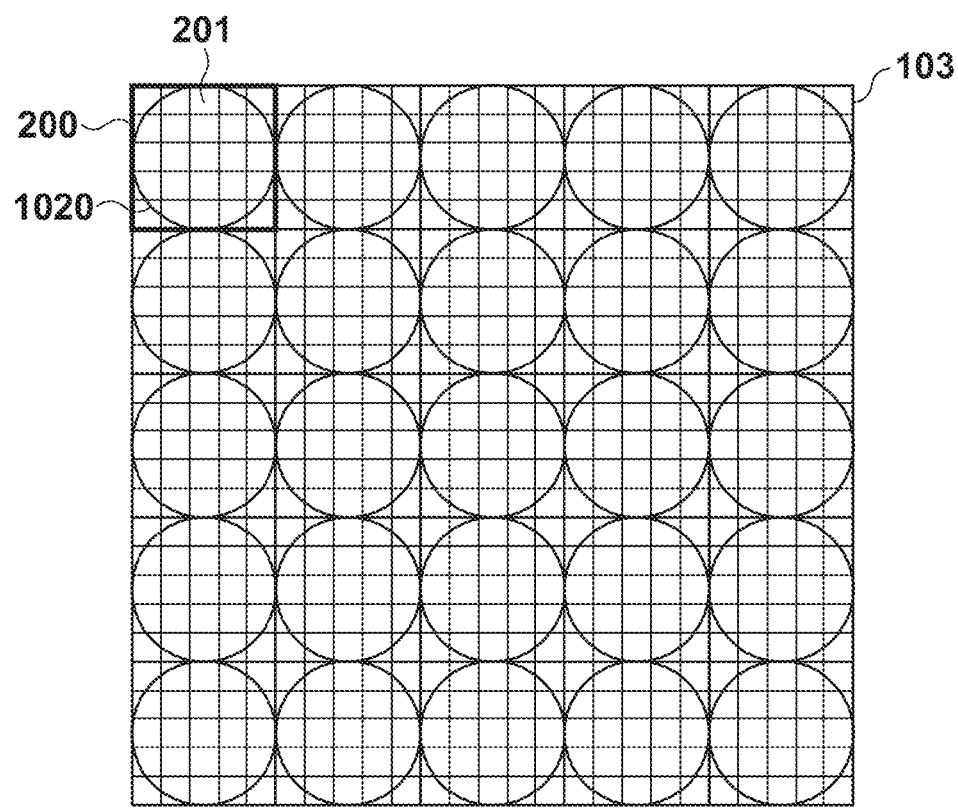
FIG. 2 is a diagram illustrating a positional relationship between pixels of an image sensor and a microlens array according to embodiments.

FIG. 2 is a diagram showing the image sensor 103 and the microlens array 102 from an optical axis Z direction in FIG. 1. Each microlens 1020 is disposed such that one microlens 1020 corresponds to multiple division pixels 201. A pixel array 200 is defined as the group of division pixels 201 behind one microlens. Note that in the first embodiment, each pixel array 200 is configured by a total of 25 division pixels 201 in five rows and five columns.

FIG. 3 is a diagram showing how light emitted from the imaging lens 101 passes through one microlens 1020 and is received by the image sensor 103, as viewed from a direction perpendicular to the optical axis Z. Light is emitted from pupil regions a1 to a5 of the imaging lens 101, passes through the center microlens 1020, and forms images on the corresponding division pixels p1 to p5 behind that microlens.

FIG. 4A is a diagram for more specifically describing light transmission regions of the imaging lens 101 shown in FIG. 3 and light receiving regions of the image sensor 103, in a view of the aperture of the imaging lens 101 from the optical axis z direction. FIG. 4B is a diagram showing one microlens 1020 and the pixel array 200 arranged behind it, as viewed from the optical axis Z direction. In the case where the number of pupil regions into which the imaging lens 101 is divided is the same as the number of pixels behind the microlens 1020 as shown in FIG. 4A, the light emitted from one divided pupil region of the imaging lens 101 forms an image on one pixel. Note that here, the F-numbers of the imaging lens 101 and the microlenses 1020 substantially match each other.

The correspondence relationship between pupil regions a11 to a55 of the imaging lens 101 shown in FIG. 4A and pixels p11 to p55 shown in FIG. 4B is a point-symmetric relationship as viewed from the optical axis Z direction. Accordingly, the light emitted from the pupil region a11 of the imaging lens 101 forms an image on the pixel p11 among the pixels in the pixel array 200 behind the microlens 1020. Similarly, the light that is emitted from the pupil region a11 and passes through another microlens 1020 also forms an image on the pixel p11 among the pixels in the pixel array 200 behind that microlens 1020.

The following describes a method for calculating the focal position (refocus plane) that corresponds to an arbitrary subject position in a screen. As shown in FIGS. 4A and 4B, each pixel in the pixel array 200 receives light that has passed through a different pupil region of the imaging lens 101. Pixel signals are combined from these divided signals so as to generate a pair of signals that have been subjected to horizontal pupil division.

$$\sum_{a=1}^{5}\sum_{b=1}^{2}(p_{ab}) \tag{1}$$

$$\sum_{a=1}^{5}\sum_{b=4}^{5}(p_{ab}) \tag{2}$$

In Expression (1), light that has passed through the left-side regions (pupil regions a11 to a51 and a12 to a52) of the exit pupil of the imaging lens 101 is integrated for pixels in a certain pixel array 200. This is applied to multiple pixel arrays 200 that are aligned in the horizontal direction, and the subject image formed by this group of output signals is an image A. Also, in Expression (2), light that has passed through the right-side regions (pupil regions a14 to a54 and a15 to a55) of the exit pupil of the imaging lens 101 is integrated for pixels in a certain pixel array 200. This is applied to multiple pixel arrays 200 that are aligned in the horizontal direction, and the subject image formed by this group of output signals is an image B. An image misalignment amount (pupil division phase difference) is then detected by subjecting the image A and the image B to a correlation operation. The focal position that corresponds to an arbitrary subject position in a screen can then be calculated by multiplying the image misalignment amount by a conversion factor that is determined based on the optical system and the focal position of the imaging lens 101.

Next is a description of processing for reconstructing an image for an arbitrarily set focal position (refocus plane), which is performed on captured data acquired by the configurations of the imaging lens 101, the microlens array 102, and the image sensor 103.

Figure 5:
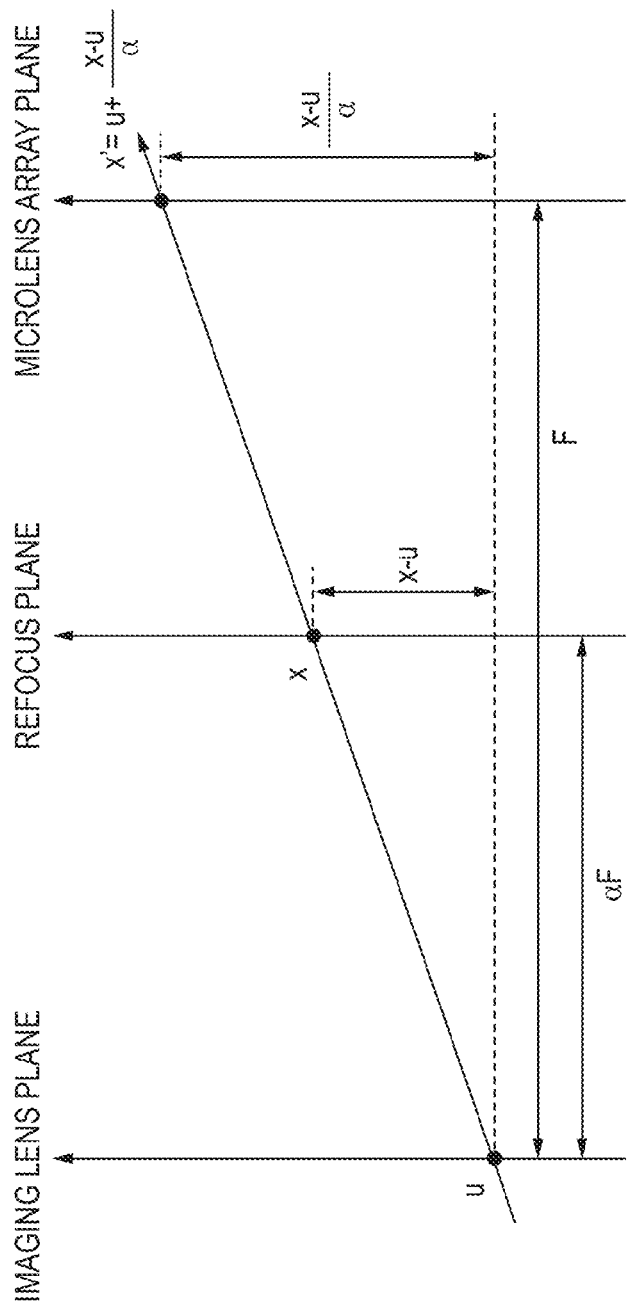
FIG. 5 is a diagram illustrating transmission regions of refocused image generation rays according to embodiments.

FIG. 5 is a diagram showing which pupil division region of the imaging lens 101 light exits from after passing through a certain pixel in an arbitrarily set refocus plane, and also which microlens 1020 that light is incident on, as viewed from a direction perpendicular to the optical axis Z. Here, the positions of the pupil division regions of the imaging lens 101 are denoted by coordinates (u,v), the positions of pixels in the refocus plane are denoted by coordinates (x,y), and the positions of the microlenses 1020 in the microlens array 102 are denoted by coordinates (x',y'). Furthermore, the distance from the imaging lens 101 to the microlens array 102 is denoted by F, and the distance from the imaging lens 101 to the refocus plane is denoted by αF. Here, α is a refocus coefficient for determining the position of the refocus plane, and can be arbitrarily set by the user or set according to scene identification, subject detection, or the like. Note that FIG. 5 only shows the u, x, and x' directions, and the v, y, and y' directions are not shown. As shown in FIG. 5, light that has passed through the coordinates (u,v) and the coordinates (x,y) arrives at the coordinates (x',y') in the microlens array 102. These coordinates (x',y') can be expressed as shown in Expression (3).

$$(x', y') = \left(u + \frac{x-u}{\alpha}, v + \frac{y-v}{\alpha}\right) \tag{3}$$

Then, letting L(x',y',u,v) denote the output of the pixel that receives this light, output E(x,y) obtained at the coordinates (x,y) in the refocus plane is obtained by integrating L(x',y',u,v) for the pupil regions of the imaging lens 101, thus giving Expression (4).

$$E(x, y) = \frac{1}{\alpha^2 F^2}\int\int L\left(u + \frac{x-u}{\alpha}, v + \frac{y-v}{\alpha}, u, v\right)dudv \tag{4}$$

In Expression (4), giving α, (x,y), and (u,v) obtains the position (x',y') of the microlens 1020 on which the light is incident. It is then possible to obtain the pixel that corresponds to the position (u,v) in the pixel array 200 that corresponds to that microlens. The output of this pixel is L(x',y',u,v). E(x,y) can then be calculated by performing the above calculation for all of the pupil division regions and integrating the obtained pixel output. Note that the integration in Expression (4) can be performed by simple addition if representative coordinates of the pupil division regions of the imaging lens are used as (u,v).

The following describes the format of auxiliary information in the present embodiment. When image capture is performed, a main image from an image signal (light field information) output from the image sensor 103 is recorded to the recording circuit 108 by the image processing circuit 106. At this time, image data (an additional image) and character data (additional information) are also generated and used as auxiliary information for the main image. The following describes operations for generating auxiliary information when image capture is performed with reference to FIG. 1 and the flowchart in FIG. 7.

First, a description of the method for generating and recording image data as the auxiliary information will be given. In step S600, image capture is performed to capture a main image. When image capture is performed, the image signal output from the image sensor 103 is subjected to analog signal processing by the AFE 104, and the resulting signal is subjected to digital signal processing by the DFE 105. After the digital signal processing, the main image is recorded to the recording circuit 108 by the image processing circuit 106. The subsequent processing is performed under control of the control circuit 109.

When the recording of the main image ends, auxiliary information is generated and recorded. In step S601, the refocus coefficient for the execution of refocusing by the image processing circuit 106 is set to an initial value by the control circuit 109. The initial value is a value according to which the focus is placed on the nearest view.

In step S602, the control circuit 109 monitors whether the refocus coefficient has been set to the value according to which the focus is placed on the farthest view, and ends processing if the refocus coefficient has reached the value indicating the farthest view. If the value indicating the farthest view has not been reached, the procedure moves to step S603. In step S603, the control circuit 109 changes the refocus coefficient towards the distant view by a certain amount. The control circuit 109 then instructs the image processing circuit 106 to perform developing using that refocus coefficient.

In step S604, the image processing circuit 106 performs subject determination processing (e.g., face determination processing) on the image (reconstruction image) that was developed using the designated refocus coefficient in step S603. The procedure moves to step S605 if it is determined as a result of the face determination that a face appears in the developed image, and the procedure returns to the processing of step S602 if it is not determined that a face appears. In step S605, the control circuit 109 controls the processing performed after face determination. Specifically, the control circuit 109 instructs the image processing circuit 106 to convert a developed image that is focused on a detected face into the JPEG format and store the developed image in the recording circuit 108 as an additional image in association with the main image. If it is determined that the same face appears in two or more developed images, the control circuit 109 controls to store the developed image including this face with the most in-focus state. As a method for identifying the developed image to be stored, it is possible to use the method for identifying the refocus coefficient by detecting the focal position based on the above-described correlation operation for the face-detected position. Alternatively, it is also possible to identify the most-in-focus developed image based on the edge detection, the degree of reliability for the face detection, and so on. In this case, for the sequentially generated developed images, the comparison as to the evaluation value for the edge or the degree of reliability for the face detection is performed, and the developed image having a larger value is kept in the memory circuit 107. The procedure then returns to the processing of step S602, and the above-described processing is repeated.

Figure 7:
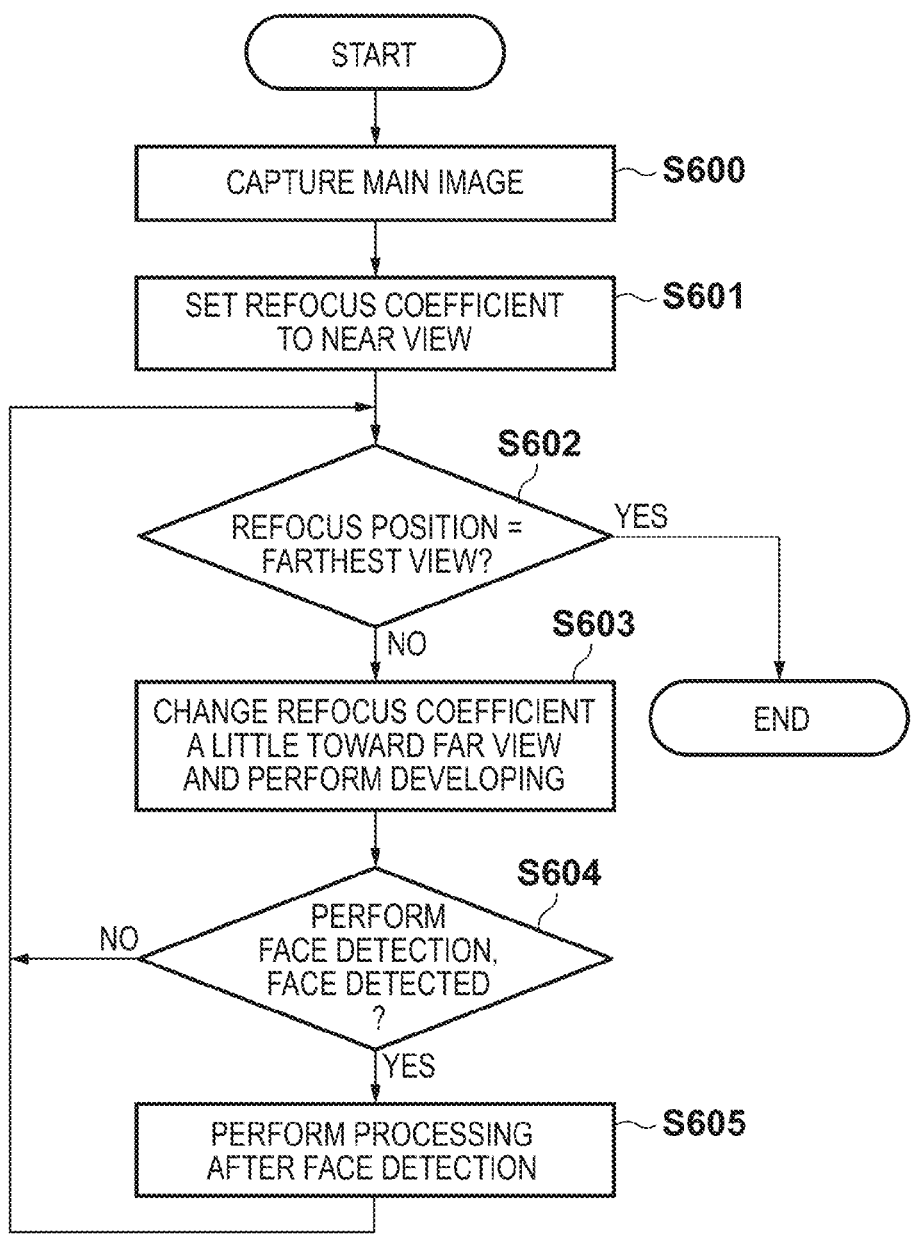
FIG. 7 is a flowchart showing a recording operation that is performed after a main image is captured according to embodiments.

Although the example where an additional image (image data) is stored as auxiliary information is shown in FIG. 7, additional information may be stored as the auxiliary information. Examples of this additional information include the value of the refocus coefficient that was used when generating the image in which the face was detected, information indicating the position of the face in the main image, and information indicating the relative size of the face relative to the size of the main image.

Figure 6:
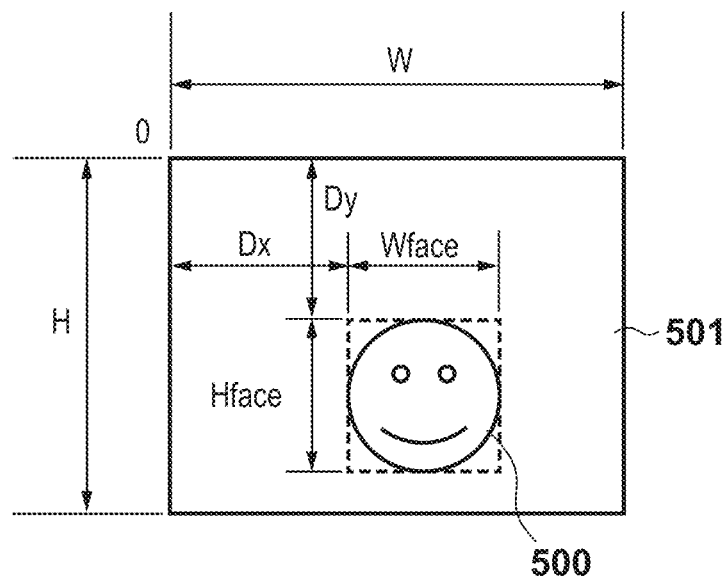
FIG. 6 is a diagram illustrating face position information and relative face size information serving as auxiliary information according to embodiments.

Face position information is a numerical representation of, using the top left point of the main image as the origin, how far rightward and downward the position at which the face appears is. This will now be described with reference to FIG. 6. Here, 501 denotes the main image. Also, 500 denotes the face that was detected. Furthermore, the width and the height of the main image are respectively denoted by W and H, and the width and the height of the face are respectively denoted by Wface and Hface. Moreover, letting Dx be the horizontal distance from an origin O to the start position of the face, and Dy be the vertical distance from the origin to the start position of the face, the relative width and the relative height of the relative size information are respectively obtained from Wface/W and Hface/H. Also, the horizontal relative distance and the vertical relative distance of the position information are respectively obtained from Dx/W and Dy/H. The control circuit 109 gives an instruction for converting this additional information into a data file and holding the data file in the recording circuit 108 in association with the main image.

Next, a description will be given of the case where a recorded main image and auxiliary information (e.g., additional images and additional information) are read out from the recording circuit 108, and the display circuit 111 performs index display of a light field image, with reference to FIGS. 8 and 9A to 9D.

Figure 9A:
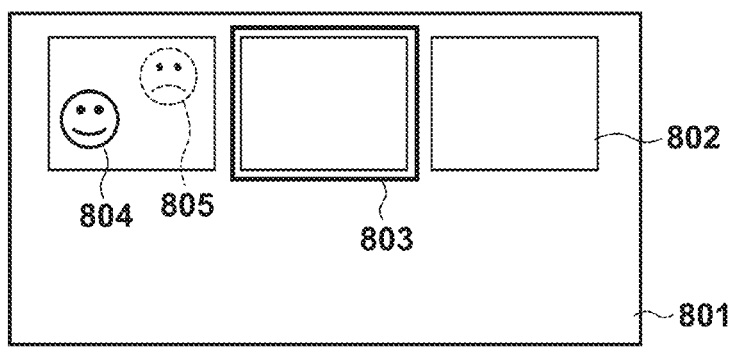
FIGS. 9A to 9D are diagrams showing examples of index displays according to embodiments.

In FIG. 9A, 801 denotes a display screen, which is part of the display circuit 111. Also, the rectangular image denoted by 802 is a thumbnail image obtained by reducing a main image. When the user instructs the operation circuit 110 to perform index display, the operation circuit 110 gives the control circuit 109 an index display instruction. Upon receiving the index display instruction, the image processing circuit 106 reads out a main image from the recording circuit 108 and reduces it so as to generate a thumbnail image. The image processing circuit 106 then passes the thumbnail image to the display circuit 111, which constructs an index screen in the display screen 801. Here, 803 denotes the cursor when one thumbnail image is selected from among multiple thumbnails, and the cursor 803 is rendered by the display circuit 111. Also, 804 denotes a person A recorded in the main image, and 805 likewise denotes a person B recorded in the main image. If the main image is developed using a specific refocus coefficient, the depth of field is shallow, and not all of the subjects are in focus. In the example shown in FIG. 9A, the person A shown by a solid line is in focus, but the person B shown by a broken line is not in focus, thus indicating that the person B is out of focus.

Figure 8:
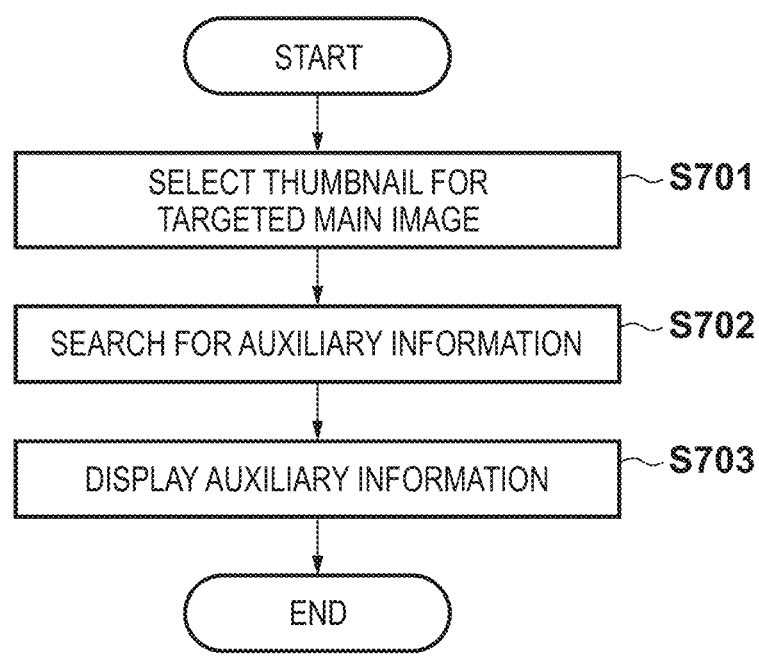
FIG. 8 is a flowchart showing an index display operation for a main image according to embodiments.
Figure 9B:
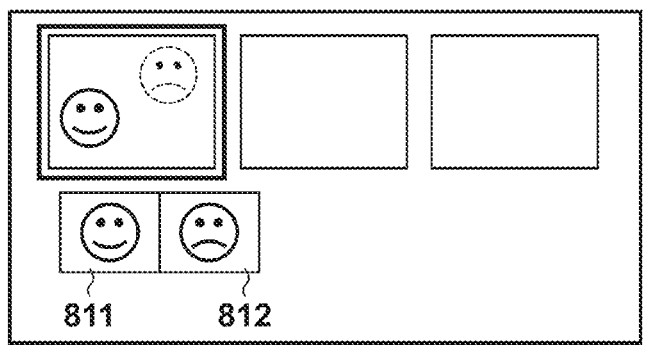

In step S701 in FIG. 8, the user instructs the operation circuit 110 to move the cursor 803 and selects a thumbnail image that is to serve as the target. FIG. 9B shows the state in which a thumbnail image has been selected.

In step S702, the control circuit 109 instructs the image processing circuit 106 to search for auxiliary information that is associated with the selected thumbnail image. The image processing circuit 106 searches the recording circuit 108 for auxiliary information that is associated with the main image corresponding to the thumbnail image that is selected in FIG. 9B. In the case where additional information (relative face position and relative face size) and additional images in which the person A and the person B were each in focus are obtained as a result of the search in step S703, the control circuit 109 displays the person A and the person B in the vicinity of the selected thumbnail image at the same time. Here, only face regions are clipped out from the additional images in which the faces were in focus based on the additional information indicating the relative face positions, and the face regions are displayed by the display circuit 111 as shown by 811 and 812. Performing display in this way enables the user to easily check who appears in an image even when viewing a thumbnail image of a main image that has a shallow depth of field.

Figure 9C:
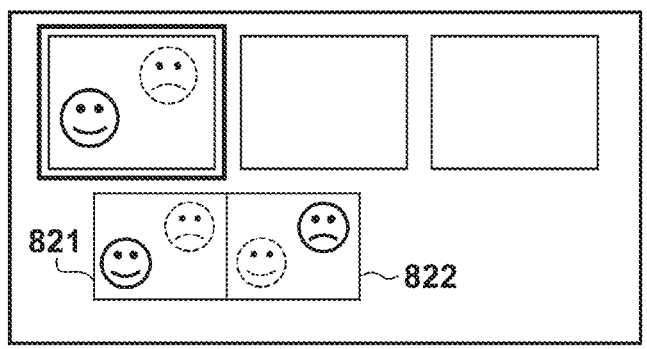

Next, a description of the case where additional images themselves are reduced and displayed will be given. This case is shown in FIG. 9C. Similarly to the case shown in FIG. 9B, the control circuit 109 instructs the display circuit 111 to display images denoted by 821 and 822 in the vicinity of the selected thumbnail image. The image 821 is an image that was developed using a first refocus coefficient, and the person A is in focus. The image 822 is an image that was developed using a second refocus coefficient, and the person B is in focus. Performing this display in this way enables the user to browse a row of images in which the faces of subjects are in focus along with the thumbnail image.

As described above, according to the first embodiment, auxiliary information is recorded in association with a main image, and an image in which a face included in the main image is in focus, which is obtained based on the recorded auxiliary information, is displayed in the vicinity of a selected thumbnail image. This enables making it easier for the user to select an intended image of a subject.

According to the present embodiment, in step S603, the respective subjects existing in the screen are identified, and in order to obtain the images in which the respective subjects are in focus, a plurality of developed images are generated by repeatedly changing the refocus coefficient from the value according to which the focus is placed on the nearest view (wide-angle side) towards the distant view by a certain amount. Alternatively, it is also possible to estimate the focal positions of the respective subjects based on the focal position information (distance map) of the respective positions of the screen derived by e.g., the above-described correlation operation etc., determine a plurality of candidates of the refocus coefficients by which the respective subjects become in focus, and use the plurality of candidates as the refocus coefficients for step S603. It is also possible to determine the certain amount of the refocus coefficient for step S603 based on the plurality of candidates.

Second Embodiment

The following is a description of a second embodiment of the present invention. In the second embodiment, when the image processing circuit 106 of the above-described first embodiment detects a face, the image processing circuit 106 furthermore carries out face recognition using a face and name database that is stored in the memory circuit 107, and records a person's name in association with a main image.

For this reason, in the second embodiment, a database in which facial features and names are associated is stored in the memory circuit 107 in FIG. 1 in advance. Also, if the image processing circuit 106 detects a face in an image developed at a certain refocus coefficient in step S605 in FIG. 7, the image processing circuit 106 then performs face recognition for that face by making an inquiry to the face and name database in the memory circuit 107. The person's name resulting from the inquiry made by the image processing circuit 106 is then treated as auxiliary information along with the additional images and/or additional information for the face in the main image that were described in the first embodiment, and the auxiliary information is recorded in the recording circuit 108 in association with the previously recorded main image. A description of the subsequent processing will not be given since it is similar to the processing described above in the first embodiment.

Figure 9D:
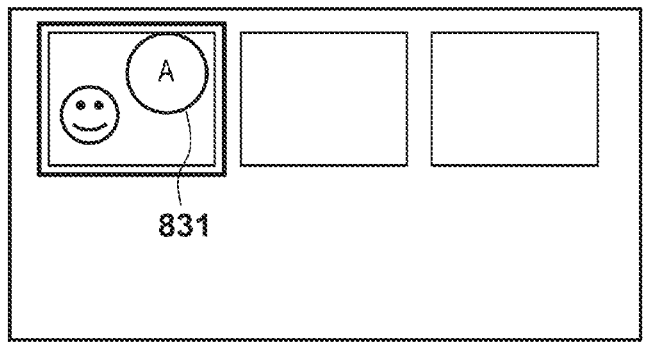

Note that in the case where name information acquired from the face and name database as in the second embodiment and relative position and relative size information relative to a main image are both available as auxiliary information, display can be performed as shown in FIG. 9D. Specifically, the control circuit 109 instructs the image processing circuit 106 to read out the main image that corresponds to the thumbnail selected by the user from the recording circuit 108, and develop the main image using a predetermined refocus coefficient. In this case, the person A is in focus in the developed image, but the person B is not in focus. For this reason, the control circuit 109 acquires, from the additional information, a name for the face of the person B 831 who is not in focus in the developed image, and instructs the display circuit 111 to display the name information so as to be superimposed on the image. As a result of performing display in this way, in the case of a face that is not in focus in a thumbnail image of a main image that has a shallow depth of field, the user can browse a thumbnail image in which a name is superimposed as characters at the approximate position of the face. This enables making it easier for the user to select an intended image of a subject.

Although the case where face determination and recording processing are performed by the image capturing apparatus is described in the first and second embodiments, the present invention is not limited to this. For example, an object of the present invention can be achieved even in the case where the processing described using FIGS. 6 to 9D is performed by an external image processing apparatus using image data that was output from the image capturing apparatus that generates image data with which refocus processing can be performed.

Also, in the above embodiments, reconstruction images obtained using various refocus coefficients are used as the images used in subject determination processing. However, it is possible to, for example, generate an image having a deep depth of field using an image obtained by collecting some of the pixels of the microlenses, which is an image in which subjects in the entire angle of view can be checked, and use that image in subject detection.

Figure 20A:
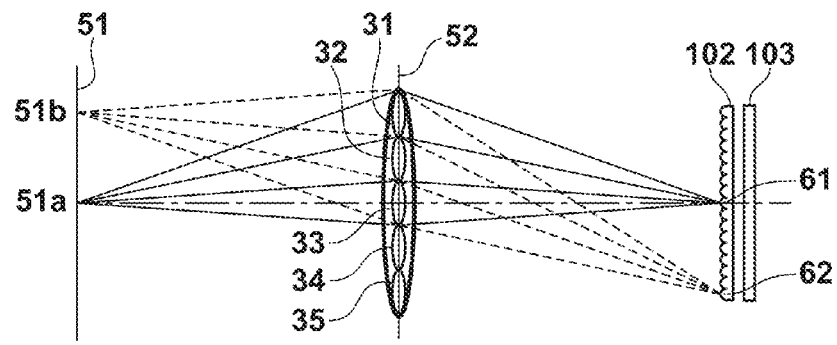
FIG. 20A is a diagram showing an optical system to which the present invention can be applied.
Figure 20B:
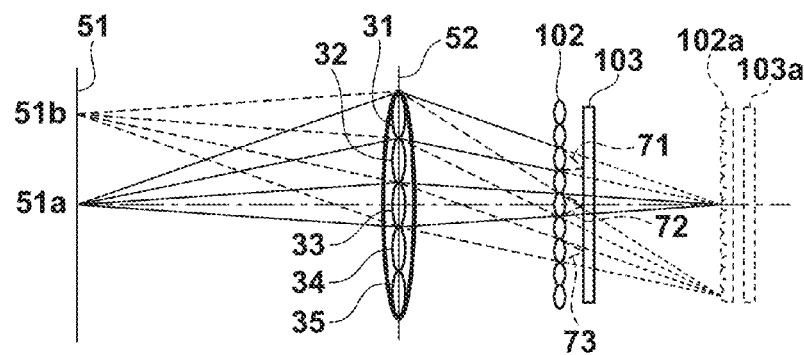
FIG. 20B is a diagram showing another optical system to which the present invention can be applied.
Figure 20C:
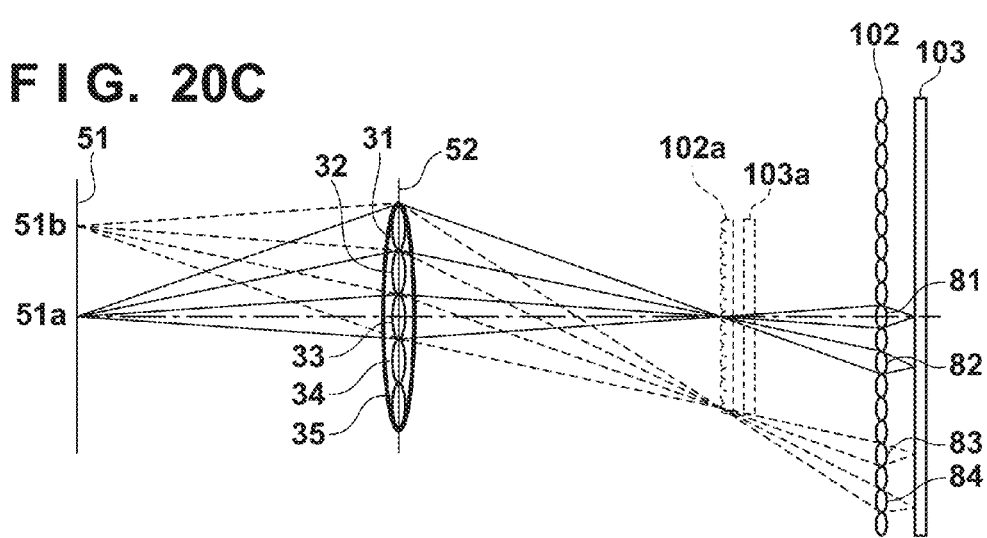
FIG. 20C is a diagram showing still another optical system to which the present invention can be applied.

The following describes an example of optical systems to which the present embodiment can be applied, with reference to FIGS. 20A to 20C. FIGS. 20A to 20C are diagrams schematically show how light rays from an object (subject) form an image on the image sensor 103. FIG. 20A corresponds to the optical system illustrated in FIG. 3, and shows the example where the microlens array 102 is arranged in the vicinity of the imaging plane of the imaging lens 101. FIG. 20B shows the example where the microlens array 102 is disposed closer to the object than the imaging plane of the imaging lens 101 is. FIG. 20C shows the example where the microlens array 102 is disposed farther from the object than the imaging plane of the imaging lens 101 is.

In FIGS. 20A to 20C, 103 denotes the image sensor, 102 denotes the microlens array, 31 to 35 denote the pupil regions a1 to a5 shown in FIG. 3, 51 denotes the object plane, 51a and 51b denote arbitrary points on the object, 52 denotes the pupil plane of the imaging lens, and 61, 62, 71, 72, 73, 81, 82, 83, and 84 denote specific microlenses in the microlens array 102. In FIGS. 20B and 20C, 103a denotes a virtual image sensor, and 102a denotes a virtual microlens array. They are shown for reference in order to clarify the correspondence relationship with FIG. 20A. Also, solid lines denote light flux that leaves from the point 51a on the object and passes through regions 31 and 33 in the pupil plane, and broken lines denote light flux that leaves from the point 51b on the object and passes through the regions 31 and 33 in the pupil plane.

In the example in FIG. 20A, the microlens array 102 is arranged in the vicinity of the imaging plane of the imaging optical system as illustrated in FIG. 3 as well, and therefore the image sensor 103 and the pupil plane 52 of the imaging lens 101 are in a conjugate relationship. Furthermore, the object plane 51 and the microlens array 102 are in a conjugate relationship. For this reason, the light flux that leaves from the point 51a on the object arrives at the microlens 61, the light flux that leaves from the point 51b arrives at the microlens 62, and the light flux that passed through the regions 31 to 35 arrives at the corresponding pixels provided behind the microlenses.

In the example in FIG. 20B, the microlens array 102 causes the light flux from the imaging lens 101 to form an image, and the image sensor 103 is provided at that imaging plane. According to this arrangement, the object plane 51 and the image sensor 103 are in a conjugate relationship. Light flux that left the point 51a on the object and passed through the region 31 of the pupil plane arrives at the microlens 71, and light flux that left the point 51a on the object and passed through the region 33 of the pupil plane arrives at the microlens 72. Light flux that left the point 51b on the object and passed through the region 31 of the pupil plane arrives at the microlens 72, and light flux that left the point 51b on the object and passed through the region 33 of the pupil plane arrives at the microlens 73. The light flux that passed through these microlenses arrives at the corresponding pixels provided behind the microlenses. In this way, images are formed at different positions depending on the point on the object and the transmission region in the pupil plane. Information similar to that in FIG. 20A can be obtained by realignment with positions on the virtual imaging plane 103a. In other words, it is possible to obtain information indicating the pupil region that was passed through (angle of incidence) and position on the image sensor.

In the example in FIG. 20C, the microlens array 102 causes the light flux from the imaging lens 101 to re-form an image (called image re-formation since light flux that previously formed an image one time and that is in a diffused state is caused to form an image), and the image sensor 103 is provided at that imaging plane. According to this arrangement, the object plane 51 and the image sensor 103 are in a conjugate relationship. Light flux that left the point 51a on the object and passed through the region 31 of the pupil plane arrives at the microlens 82, and light flux that left the point 51a on the object and passed through the region 33 of the pupil plane arrives at the microlens 81. Light flux that left the point 51b on the object and passed through the region 31 of the pupil plane arrives at the microlens 84, and light flux that left the point 51b on the object and passed through the region 33 of the pupil plane arrives at the microlens 83. The light flux that passed through these microlenses arrives at the corresponding pixels provided behind the microlenses. Similarly to FIG. 20B, information similar to that in FIG. 20A can be obtained by realignment with positions on the virtual imaging plane 103a. In other words, it is possible to obtain information indicating the pupil region that was passed through (angle of incidence) and position on the image sensor.

Although examples where position information and angle information can be acquired by using the microlens array (phase modulation element) as a pupil division unit are shown in FIGS. 20A to 20C, another optical configuration can be used as long as it is possible to acquire position information and angle information (equivalent to limiting the pupil transmission regions). For example, it is possible to use a method in which a mask (gain modulation element) provided with an appropriate pattern is inserted into the optical path of the imaging optical system.

Third Embodiment

Recent years have seen the development of technology for restoring a degraded image in which blurring (focus deviation) occurred. In an image restoration apparatus disclosed in Japanese Patent No. 2963990, an aperture provided with a pattern is disposed in an imaging optical system, and a range image and a focused image that is in focus are obtained by acquiring an observed image and analyzing the observed image based on the pattern of the aperture.

Also, Japanese Patent Laid-Open No. 2000-020691 discloses a method according to which a degraded image in which image shake or blurring occurred is restored to a high-quality image. Letting $f(x,y)$ be an ideal image, $g(x,y)$ be a degraded image, and an image degradation function be $h(x,y)$, the degraded image $g(x,y)$ is expressed as shown below.

$$g(x,y)=\iint h(x-x',y-y')f(x',y')dx'dy' \qquad (5)$$

Here, letting $F(u,v)$ be the Fourier transformation of the ideal image $f(x,y)$, $G(u,v)$ be the Fourier transformation of the degraded image $g(x,y)$, and $H(u,v)$ be the Fourier transformation of the image degradation function $h(x,y)$, Expression (5) can be rewritten as shown below.

$$G(u,v)=H(u,v)F(u,v) \qquad (6)$$

Modifying Expression (6) obtains the ideal image as shown in rewritten form below.

$$F(u,v)=G(u,v)/H(u,v) \qquad (7)$$

In this way, Japanese Patent Laid-Open No. 2000-020691 discloses a method in which the degradation function $h(x,y)$ is generated based on characteristics information of the image capturing apparatus, for example, and the restored image $f(x,y)$ is generated based on the degradation function. However, since restoration processing is performed on the entirety of the captured image, it is difficult to obtain a shallow depth of field image in which the focus is placed on the main subject.

In view of this, technology for correcting focus deviation with respect to a specific subject in a captured image is provided in the third embodiment.

FIG. 10 shows the overall configuration of a digital camera 1 according to the third embodiment. In FIG. 10, an imaging lens 2 is a lens for forming subject light into an image on an image sensor 3, and the imaging lens 2 is fixed at a predetermined position relative to the image sensor 3. Since the imaging lens 2 of the present embodiment does not have a focal point adjustment mechanism, the size of the digital camera 1 can be reduced. Also, although the imaging lens 2 is shown as a single lens in FIG. 10, the imaging lens 2 is actually configured by multiple lenses in order to satisfy a lens performance requirement.

The digital camera 1 includes a CPU 7 that performs overall control of the digital camera 1, and an application specific integrated circuit (ASIC) 6 that restores an image that is out of focus (accompanied by focus deviation) through image processing (i.e., corrects focus deviation). The digital camera 1 also includes a display unit 4 (liquid crystal display or the like) that displays restored images, a memory 8 that records images captured by the image sensor 3, and a trigger unit 9 by which a photographer instructs the execution of an image capture operation.

The trigger unit 9 is configured by a two-level switch by which the photographer executes an image capture operation, and is configured such that a first switch turns on when the trigger unit 9 is pressed to a first level, and a second switch turns on when the trigger unit 9 is pressed to a second level.

The digital camera 1 also includes a viewfinder unit 5 that includes an additional function of designating a main subject. The viewfinder unit 5 includes an optical viewfinder for optically observing a subject via a lens, and a line-of-sight detector that detects the position being viewed by the photographer who is observing a subject via the optical viewfinder. The optical viewfinder is, for example, a real-image viewfinder constituted by an objective lens, an eyepiece, and a Porro prism, which is an image transformation unit, and a polymer-dispersed liquid crystal display element is arranged on the image plane of the objective lens.

FIG. 11 is diagram illustrating the division of an image capture screen. As shown in FIG. 11, the image capture screen is divided into 8×10 blocks, for example. When the position viewed by the photographer is detected by the line-of-sight detector, the CPU 7 specifies the block that includes the viewed position from among the blocks into which the screen is divided. Information indicating the block that includes the viewed position is then recorded to the memory 8 by the CPU 7 as information indicating the main subject that the photographer desires to be in focus (main subject information).

Next, a description of image capture processing and restoration processing of the third embodiment will be given with reference to FIG. 12. The processing of this flowchart is started when the power supply of the digital camera 1 is turned on by a power supply switch (not shown).

In step S101, the CPU 7 determines whether the image capture mode has been selected as the operation mode of the digital camera 1. In the case where the image capture mode has not been selected (an image reproduction mode has been selected), the procedure proceeds to step S102, and in the case where the image capture mode has been selected, the procedure proceeds to step S103.

In step S102, the CPU 7 reads out image data that is recorded in the memory 8. The procedure then proceeds to step S109 (the processing of step S109 will be described later).

In step S103, the CPU 7 checks the state of the first switch of the trigger unit 9. In the case where the first switch is on, the procedure proceeds to step S104, and if otherwise, the procedure returns to step S101.

Figure 13A:
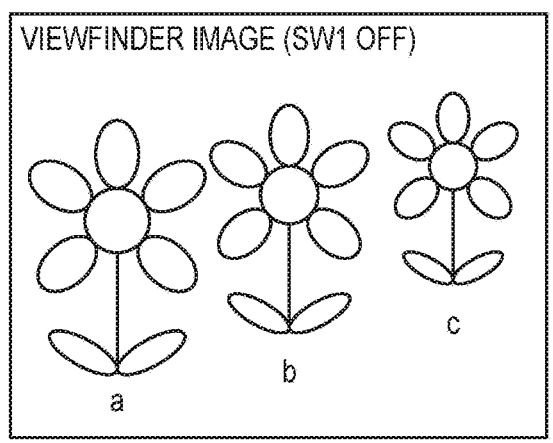
FIG. 13A is a diagram illustrating a viewfinder image in the case where a first switch is off in an image capture mode.
Figure 15A:
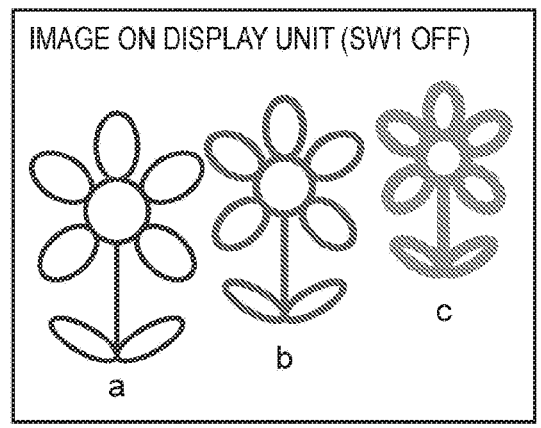
FIG. 15A is a diagram illustrating an image displayed on a display unit 4 in the case where the first switch is off in the image capture mode according to the third embodiment.

The following describes the display state of the viewfinder unit 5 and the display unit 4 in the case where the first switch is off in the image capture mode with reference to FIGS. 13A and 15A. FIG. 13A is a diagram illustrating a viewfinder image in the case where the first switch is off in the image capture mode. The photographer looking through the viewfinder unit 5 observes a subject a, a subject b, and a subject c. With the optical viewfinder of the present embodiment, the focusing screen is not arranged in the optical path, and therefore the photographer can observe a clear and focused subject image. At the same time, the image captured by the image sensor 3 via the imaging lens 2 is displayed on the display unit 4 as shown in FIG. 15A. Since the imaging lens 2 of the present embodiment is fixed at a predetermined position relative to the image sensor 3, and focal point adjustment is not performed, an out-of-focus subject image is captured in the case where the subject is not in a position that is conjugate with the image sensor 3 relative to the imaging lens 2. In FIG. 15A, the subject a that is the shortest distance away is the least out of focus (has the lowest degree of focus deviation), and the subject c that is the farthest distance away is the most out of focus.

When the first switch turns on, in step S104, the CPU 7 causes the line-of-sight detector included in the viewfinder unit 5 to operate so as to detect the position of a main subject in the image capture screen. The line-of-sight detector is configured by an illumination device that illuminates the photographer's eye, and a lens system and image sensor for receiving light that has been reflected by the photographer's eye. The method for detecting the photographer's line of sight can be any known method, one example of which is the method disclosed in Japanese Patent Laid-Open No. 2-264632. When the position viewed by the photographer is detected, the CPU 7 specifies the block that includes the viewed position from among the blocks into which the screen is divided. In the later-described restoration processing, the subject included in this specified block is treated as the main subject that the photographer desires to be in focus.

Figure 13B:
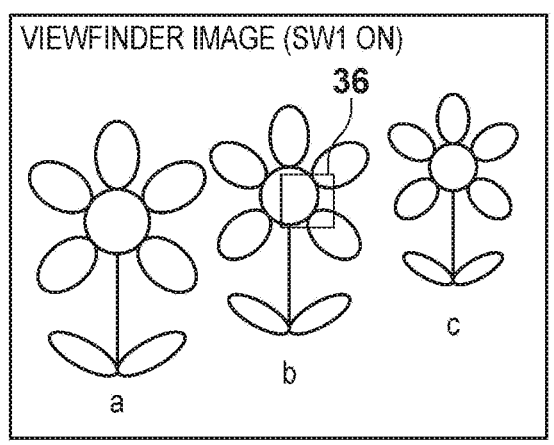
Figure 15B:
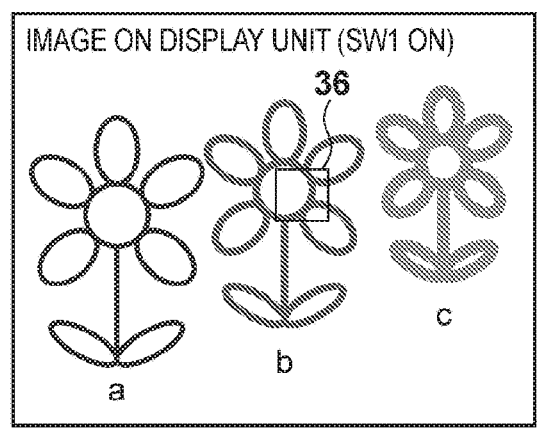
FIG. 15B is a diagram illustrating an image displayed on the display unit 4 in the case where the first switch is on according to the third embodiment.

In step S105, the CPU 7 uses a display element provided in the viewfinder unit 5 to display an image indicating the block that includes the viewed position that was detected by the line-of-sight detector (i.e., the position of the main subject) so as to be superimposed on the viewfinder image. FIG. 13B is a diagram illustrating the viewfinder image in the case where the first switch is on, and a frame image indicating that a block 36 has been selected as the position of the main subject is being displayed. At the same time, a frame image indicating the position of the main subject in the image that was captured by the image sensor 3 via the imaging lens 2 is displayed on the display unit 4 in a superimposed manner as shown in FIG. 15B. In other words, a frame image indicating that the block 36 has been selected as the position of main subject that is to be in focus is displayed on the image that was captured by the image sensor 3.

In step S106, the CPU 7 checks the state of the second switch of the trigger unit 9. In the case where the second switch is on, the procedure proceeds to step S107, and if otherwise, the procedure returns to step S101.

In step S107, the CPU 7 captures an image using the imaging lens 2 and the image sensor 3. In step S108, the CPU 7 records, in the memory 8, image data expressing the captured image, along with information that indicates the position (block number) of the most recent main subject detected in step S104 (main subject information). The main subject information may be stored in a header portion of the image data, for example.

In step S109, the CPU 7 checks whether the digital camera 1 has been set to a mode in which image restoration processing is executed by a setting button (not shown). In the case where the digital camera 1 has been set to the mode in which image restoration processing is executed, the procedure proceeds to step S110, and if otherwise, the procedure proceeds to step S111.

In step S110, the CPU 7 performs image restoration processing based on the image data and the main subject information that were recorded in the memory 8 in step S108. Alternatively, in the case where the processing of step S102 was performed, the CPU 7 performs image restoration processing based on the image data and the main subject information that were read out in step S102.

Figure 14:
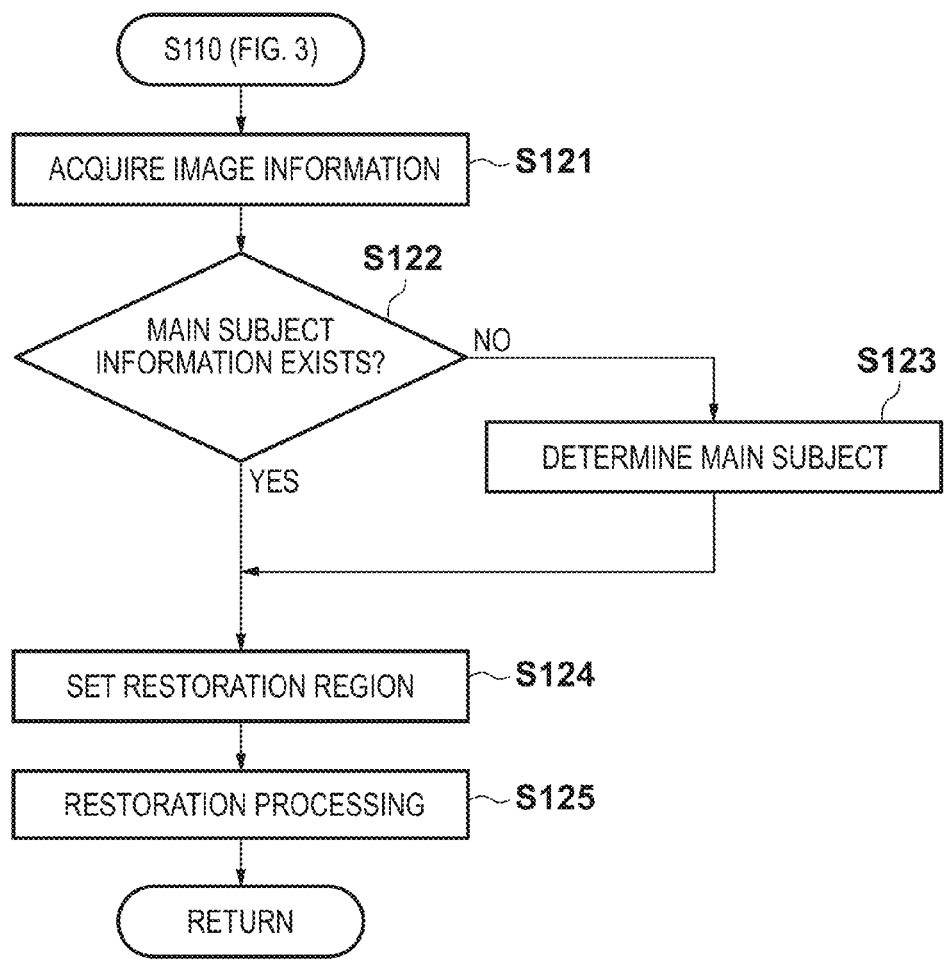
FIG. 14 is a flowchart showing details of the restoration processing in step S110 of FIG. 12.

The following is a detailed description of the restoration processing in step S110 with reference to FIG. 14. In step S121, the CPU 7 acquires image information that is associated with the image data targeted for processing. In step S122, the CPU 7 determines whether main subject information is included in the acquired image information. In the case where main subject information is included, the procedure proceeds to step S124, and if otherwise, the procedure proceeds to step S123.

For example, in the case where a main subject was not detected due to the failure of the line-of-sight detector to detect the position viewed by the photographer in step S104, main subject information is not included in the image information. In view of this, in step S123, the ASIC 6 determines a main subject based on the image data targeted for processing. In one specific example, the ASIC 6 detects a person's face in the image, and sets the detected face as the main subject.

Note that known face detection technology can be used in the face detection of the present embodiment. Examples of known face detection technology include a learning-based technique that uses a neural network or the like, and a technique in which sites that have characteristic shapes (e.g., the eyes, nose, and mouth) are found in an image using template matching, and a region is considered to be a face if the degree of similarity is high. Many other techniques have been proposed, such as a technique of detecting image feature amounts such as skin color and eye shape and performing statistical analysis. Generally, two or more of these methods are combined in order to improve the precision of the face detection. One specific example is the method disclosed in Japanese Patent Laid-Open No. 2002-251380, in which face detection is performed using wavelet transformation and image feature amounts.

In steps S124 and S125, the ASIC 6 executes restoration processing on the image data targeted for processing (i.e., the ASIC 6 manipulates the image data so as to correct focus deviation with respect to the subject indicated by the main subject information (or the main subject that was determined in step S123)). Specifically, in step S124, a region that is accompanied by focus deviation of the same (substantially the same) degree as that of the subject indicated by the main subject information in the image is set as a restoration region by the ASIC 6. Then in step S125, the ASIC 6 manipulates the image data with respect to the restoration region that was set, so as to correct the focus deviation.

A degradation function h(x,y) is generated based on optical characteristics information of the digital camera 1 or the like, and the degradation function is used to execute the restoration processing based on the aforementioned Expression (7). At this time, a region whose degradation function falls within a predetermined difference from the degradation function h(x,y) for the main subject is specified as the restoration region that is accompanied by focus deviation of the same degree as that of the main subject. For example, in the case where the degradation function h(x,y) is a point spread function, it can be determined that the degradation function falls within a predetermined difference if the half width difference is less than or equal to a predetermined value.

Figure 15C:
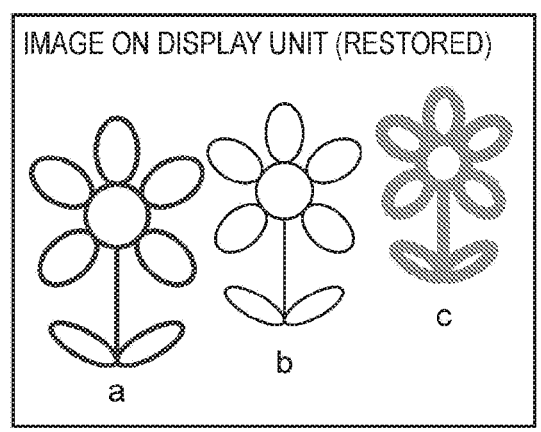
FIG. 15C is a diagram illustrating a restored image according to the third embodiment.

In the present embodiment, the main subject information indicates the block 36, as shown in FIG. 15B. In view of this, a region that includes the block 36 and includes the subject b that is out of focus to the same degree (i.e., accompanied by focus deviation of the same degree) as the subject in the block 36 region is set as the restoration region by the ASIC 6. The restored image is, as shown in FIG. 15C for example, an image in which the subject a and the subject c remain out of focus, and only the subject b is in focus. Also, in the case where a face was set as the main subject in step S123, it is thought that not only the face, but also the person's entire body will likewise be out of focus, and therefore the restored image will be an image in which the entire person is in focus. In this way, according to the present embodiment, focus deviation with respect to a specific subject in a captured image is corrected.

Returning to FIG. 12, in step S111, the CPU 7 displays the restored image on the display unit 4 as shown in FIG. 15C, for example. Alternatively, in the case where the procedure jumped from step S109 to step S111, the CPU 7 displays an unrestored image on the display unit 4.

As described above, according to the present embodiment, the digital camera 1 records main subject information along with image data in the memory 8 when an image is captured. Then, when image restoration processing is executed, the digital camera 1 manipulates the image data with respect to a region that is accompanied by focus deviation of the same (substantially the same) degree as that of the subject indicated by the main subject information, so as to correct the focus deviation. This enables correcting focus deviation with respect to a specific subject included in a captured image, and enables obtaining a shallow depth of field image in which the main subject is in focus, for example. Also, since main subject information is recorded when an image is captured, there is an increased possibility of obtaining main subject information that indicates the main subject that the photographer actually intended.

Note that although the example where part of the viewfinder unit 5 is configured by an optical viewfinder is given in the present invention, part of the viewfinder unit 5 may be an electronic viewfinder configured by a liquid crystal display, an electro-luminescence (EL) display, or the like. Also, although image restoration processing that is performed on a still image is described in the present embodiment, the present embodiment can be similarly applied in the case of moving images as well.

Fourth Embodiment

In the third embodiment, a main subject is determined by the line-of-sight detector. A variation related to the determination of a main subject is described in a fourth embodiment. There are also other slight differences from the third embodiment, which will be described in detail below.

FIG. 16 shows the overall configuration of the digital camera 1 according to the fourth embodiment. In FIG. 16, constituent elements that are similar to those in FIG. 10 are denoted by the same reference signs, and descriptions thereof will not given. The digital camera 1 includes a trackball 10. The trackball 10 can be pressed to two levels in the direction of sinking into the body of the digital camera 1. The trackball 10 is configured such that a first switch turns on when the trackball 10 is pressed to a first level, and a second switch turns on when the trackball 10 is pressed to a second level. Also, the trackball 10 can rotate when pressed to the first level, and the photographer can designate the position of the main subject that is to be in focus by rotating the trackball 10.

FIG. 17 is a flowchart showing image capture processing and restoration processing according to the fourth embodiment. In FIG. 17, steps involving processing that is similar to that in FIG. 12 are denoted by the same reference signs, and only differences from FIG. 12 will be described. The processing of this flowchart is started when the power supply of the digital camera 1 is turned on by a power supply switch (not shown).

Figure 12:
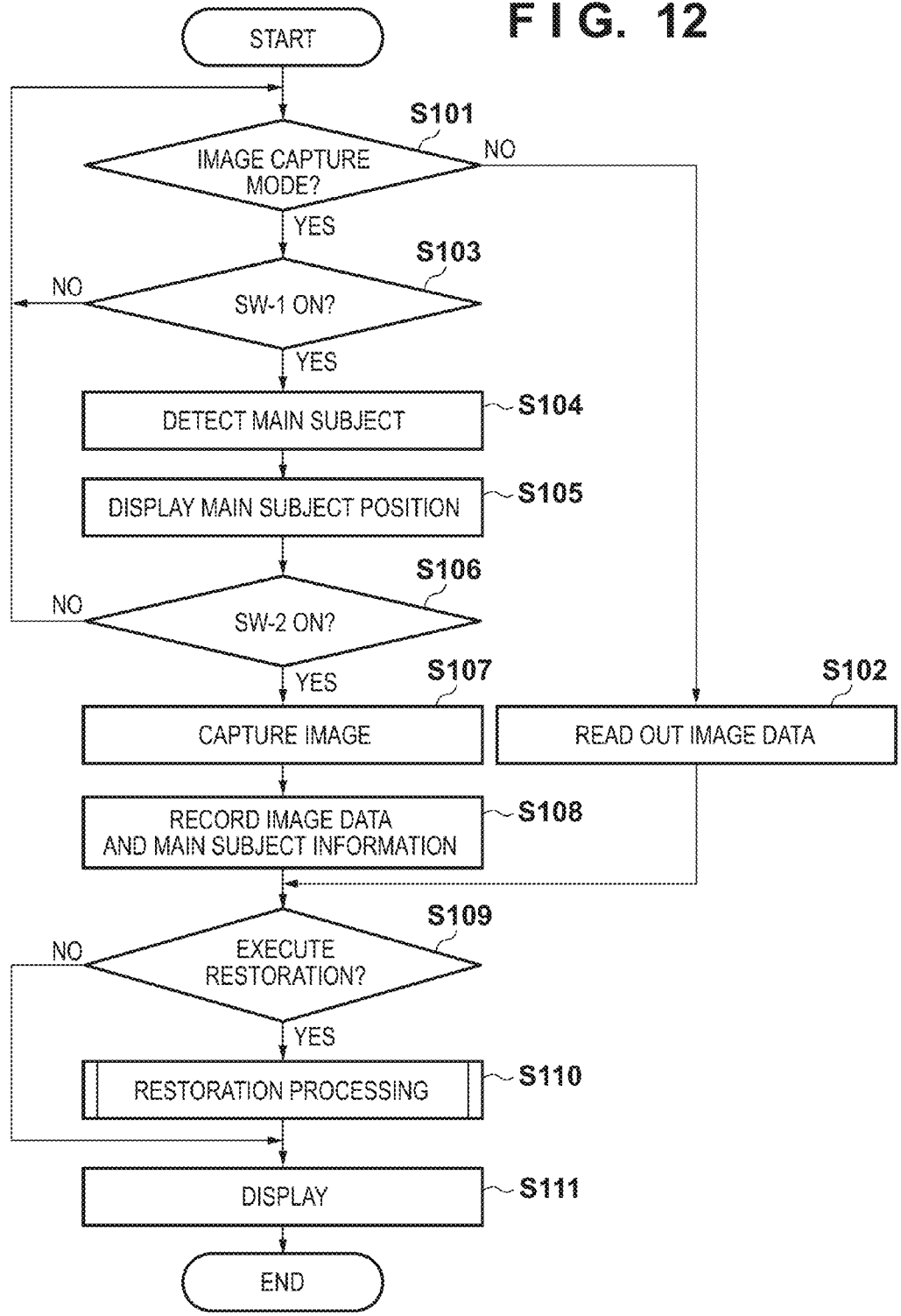
FIG. 12 is a flowchart showing image capture processing and restoration processing according to the third embodiment.
Figure 18A:
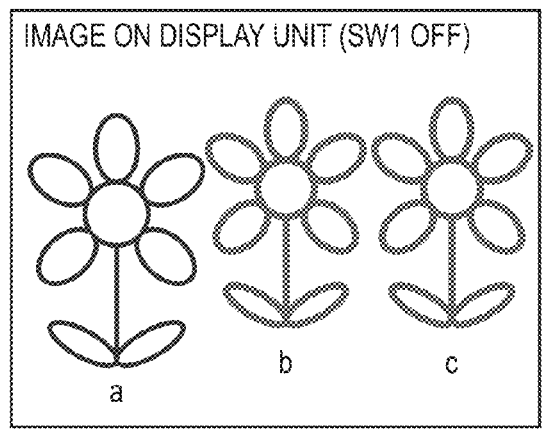
FIG. 18A is a diagram illustrating an image displayed on the display unit 4 in the case where the first switch is off in the image capture mode according to a fourth embodiment.

The processing of steps S101 and S103 is similar to that in the third embodiment (FIG. 12). However, in the present embodiment, it is assumed that the image shown in FIG. 18A is displayed on the display unit 4. Since the imaging lens 2 of the present embodiment is fixed at a predetermined position relative to the image sensor 3, and focal point adjustment is not performed, an out-of-focus subject image is captured in the case where the subject is not in a position that is conjugate with the image sensor 3 relative to the imaging lens 2. In the example in FIG. 18A, the subject a that is the shortest distance away is the least out of focus, and the subjects b and c that are a farther distance away are more out of focus.

The processing of step S102 is similar to that in the third embodiment (FIG. 12). However, the processing of step S201 is executed after step S102. In step S201, the CPU 7 reads out, from the memory 8, image information that is associated with the image data that was read out in step S102, and determines whether restoration has already been performed on the image data. In the case where restoration has been performed, the procedure proceeds to step S204, and if otherwise, the procedure proceeds to step S110.

On the other hand, in the case where the first switch has turned on in the image capture mode, rotation of the trackball 10 becomes possible. In step S202, the CPU 7 detects rotation of the trackball 10 and specifies the block at a position that corresponds to the rotation. In the present embodiment, the subject included in this specified block is treated as the main subject that the photographer desires to be in focus.

Figure 18B:
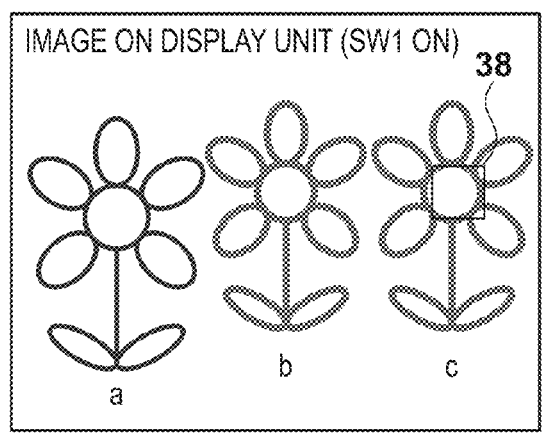
FIG. 18B is a diagram illustrating an image displayed on the display unit 4 in the case where the first switch is on according to the fourth embodiment.

The processing of steps S105 and S106 is similar to that in the third embodiment (FIG. 12). However, in the present embodiment, it is assumed that the image shown in FIG. 18B is displayed on the display unit 4. In other words, in the present embodiment, the subject included in the block 38 is the main subject. The method for dividing the image capture screen is similar to that in the third embodiment (see FIG. 11). The photographer can designate the main subject that is to be in focus by rotating the trackball 10 while viewing the frame image displayed on the display unit 4.

The processing of steps S107 and S110 is similar to that in the third embodiment (FIGS. 12 and 14). However, in the case of arriving at step S110 after performing the processing of step S107, image data and main subject information have not been recorded in the memory 8 at this point (they have been recorded in a temporary memory that is not shown), unlike the third embodiment. In view of this, the CPU 7 and the ASIC 6 read out image data and main subject information from the temporary memory and execute restoration processing.

Figure 18C:
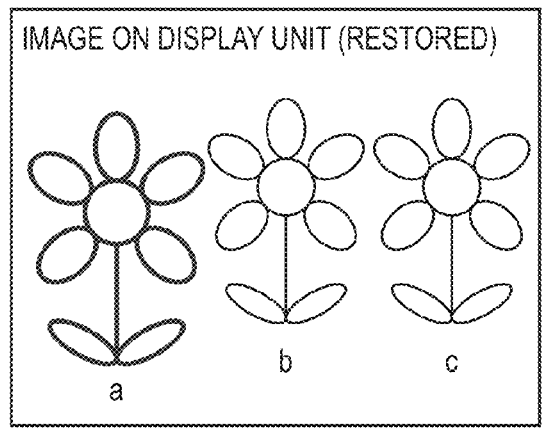
FIG. 18C is a diagram illustrating a restored image according to the fourth embodiment.

In the present embodiment, the main subject information indicates the block 38, as shown in FIG. 18B. In view of this, a region that includes the block 38 and includes the subjects b and c that are out of focus to the same degree (i.e., accompanied by focus deviation of the same (substantially the same) degree) as the subject in the block 38 region is set as the restoration region by the ASIC 6. The restored image is, as shown in FIG. 18C for example, an image in which the subject a is out of focus, the subject c is in focus as intended by the photographer, and the subject b that is at substantially the same subject distance as the subject c is in focus. Executing restoration processing on a subject that is at the same subject distance obtains an image that is free of strangeness.

Figure 19:
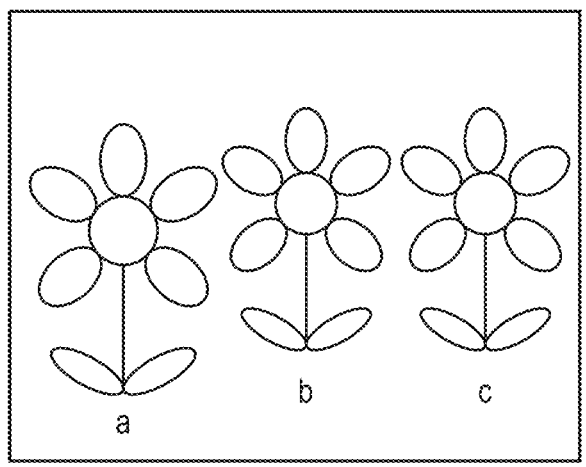
FIG. 19 is a diagram illustrating a restored image in the case where a main subject was not detected, according to the fourth embodiment.

Also, in the case where, for example, a face is not detected and a main subject is not determined in step S123 in FIG. 14, the ASIC 6 sets the entire region of the image as the restoration region. In this case, the restored image is an image in which, as shown in FIG. 19 for example, the subjects a, b, and c are all in focus.

Returning to FIG. 17, in step S203, the CPU 7 records the restored image data and restoration information (information indicating that the image data has been subjected to restoration processing) to the memory 8. Subsequently, in step S204, the CPU 7 displays the restored image on the display unit 4.

As described above, according to the present embodiment, a main subject is designated using the trackball 10. Also, unlike the third embodiment, restored image data is recorded in the memory 8. Furthermore, in the case where main subject information is not acquired, and a main subject was not determined by face detection or the like for some sort of reason, focus deviation is corrected for the entire region of the image.

Note that the present embodiment describes the example where the method of designating a main subject is designation by pressing the trackball 10 to a first level and then rotating it. However, the digital camera 1 may be configured such that a separate switch for allowing rotation of the trackball is provided, and a main subject can be designated without pressing the trackball to the first level.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-179909, filed Aug. 19, 2011, and No.

2012-005667, filed Jan. 13, 2012, and No. 2012-160943, filed Jul. 19, 2012, which are hereby incorporated by reference herein in their entirety.

What is claimed is:

1. An image processing apparatus comprising:
    an obtaining unit configured to obtain image data captured by an image sensor from which a reconstruction image can be generated by performing refocus processing on the image data;
    an image processing unit configured to generate a first reconstruction image from the image data at a focal plane at which a subject is detected; and
    a display unit configured to display the first reconstruction image and a second reconstruction image generated from the image data at a focal plane together,
    wherein the first and second reconstruction images include the subject, and
    wherein the image processing unit determines a plurality of focal planes for which a plurality of the first reconstruction images is to be generated, based on focal position information for respective positions in a screen of the image data output from the image sensor.

2. The image processing apparatus according to claim 1, wherein the first reconstruction image is recorded, as auxiliary information, in a reduced size.

3. The image processing apparatus according to claim 2, wherein the auxiliary information includes at least one position information indicating a position of a detected face in an image of the image data, and relative size information indicating a relative size of the face relative to the size of the image.

4. The image processing apparatus according to claim 1, wherein the display unit displays thumbnail images of the first and second reconstruction images.

5. The image processing apparatus according to claim 2, wherein the display unit displays a thumbnail image of the second reconstruction image, and displays a face image that was clipped out of the first reconstruction image, based on the auxiliary information.

6. The image processing apparatus according to claim 1, further comprising a storing unit configured to store information that associates a facial feature and a name,
    wherein, in a case of determining that the subject appears, the image processing unit acquires a name that corresponds to the determined subject from the information stored in the storing unit, and the storing unit further records the acquired name as auxiliary information in association with the image data.

7. The image processing apparatus according to claim 6, wherein the display unit displays a thumbnail image of the second reconstruction image, and the name.

8. The image processing according to claim 1, wherein the image processing unit generates respective reconstruction images for a plurality of focal planes, and generates auxiliary information using one of the generated reconstruction images in which the subject is in focus.

9. The image processing apparatus according to claim 8, wherein the image processing unit identifies the reconstruction image in which the subject is in focus based on focal position information for respective positions in a screen of the image data output from the image sensor.

10. The image processing apparatus according to claim 1, wherein the image processing unit determines a plurality of focal planes for which the first reconstruction image is to be generated, based on focal position information for respective positions in a screen of the image data output from the image sensor.

11. The image processing apparatus according to claim 1, further comprising a plurality of microlenses configured to be arranged between an imaging lens and the image sensor, each microlens corresponding to respective one of a plurality of regions of the image sensor, each region being composed of a predetermined number of pixels,
    wherein the image sensor is composed of a plurality of two-dimensionally arranged pixels, the image sensor being configured to perform photoelectric conversion on incident light and output the image data.

12. The image processing apparatus according to claim 1, wherein the refocus processing is a reconstruction processing of pixels of the image data captured from the image sensor for generating the reconstruction image at a focal plane.

13. The image processing apparatus according to claim 1, wherein the image data captured from the image sensor is light field data.

14. The image processing apparatus according to claim 1, further comprising a recording unit configured to record the image data that was output from the image sensor, and record the first reconstruction image and corresponding refocus information as auxiliary information in association with the image data.

15. The image processing apparatus according to claim 1, wherein the image data captured by the image sensor comprises data output from each photoelectric converter of the image sensor.

16. The image processing apparatus according to claim 1, wherein the refocus processing includes realignment processing on pixels of the image data.

17. The image processing apparatus according to claim 1, wherein the refocus processing includes addition processing on output of corresponding photoelectric converters of the image sensor.

18. An image capturing apparatus comprising:
    an image sensor configured to capture image data from which a reconstruction image can be generated by performing refocus processing on the image data;
    an image processing unit configured to generate a first reconstruction image from the image data at a focal plane at which a subject is detected; and
    a display unit configured to display the first reconstruction image and a second reconstruction image generated from the image data at a focal plane together,
    wherein the first and second reconstruction images include the subject, and
    wherein the image processing unit determines a plurality of focal planes for which a plurality of the first reconstruction images is to be generated, based on focal position information for respective positions in a screen of the image data output from the image sensor.

19. A method of controlling an image processing apparatus having an image sensor configured to capture image data from which a reconstruction image can be generated by performing refocus processing on the image data and a processing unit configured to generate a reconstruction image, the method comprising:
    generating, by the processing unit, a first reconstruction image from the image data at a focal plane at which a subject is detected; and
    displaying the first reconstruction image and a second reconstruction image generated from the image data at a focal plane together,
    wherein the first and second reconstruction images include the subject, and wherein, in the generating, a plurality of focal planes for which a plurality of the first reconstruction images is to be generated is determined, based on focal position information for respective positions in a screen of the image data output from the image sensor.

20. A non-transitory computer-readable storage medium storing a program for causing a computer to execute a method of controlling an image processing apparatus having an image sensor configured to capture image data from which a reconstruction image can be generated by performing refocus processing on the image data and a processing unit configured to generate a reconstruction image, the method comprising:
generating, by the processing unit, a first reconstruction image from the image data at a focal plane at which a subject is detected; and
displaying the first reconstruction image and a second reconstruction image generated from the image data at a focal plane together,
wherein the first and second reconstruction images include the subject, and
wherein, in the generating, a plurality of focal planes for which a plurality of the first reconstruction images is to be generated is determined, based on focal position information for respective positions in a screen of the image data output from the image sensor.

21. An image capturing apparatus comprising:
an image sensor having a plurality of photoelectric converters each being configured to output a signal, wherein an image at a focal plane can be generated by performing realignment processing on a plurality of signals output from the plurality of photoelectric converters;
a processing unit configured to generate a first image, from the plurality of signals, at a focal plane at which a subject is detected; and
a display unit configured to display the first image and a second image generated from the plurality of signals at a focal plane together,
wherein the first and second images include the subject, and
wherein the processing unit determines a plurality of focal planes for which a plurality of the first images is to be generated, based on focal position information for respective positions in a screen of the plurality of signals output from the plurality of photoelectric converters.

22. A method of controlling an image capturing apparatus having an image sensor having a plurality of photoelectric converters each being configured to output a signal, wherein an image at a focal plane can be generated by performing realignment processing on a plurality of signals output from the plurality of photoelectric converters, and a processing unit configured to generate an image at a focal plane, the method comprising:
generating, by the processing unit, a first image, from the plurality of signals, at a focal plane at which a subject is detected; and
displaying the first image and a second image generated from the plurality of signals at a focal plane together,
wherein the first and second images include the subject, and
wherein, in the generating, a plurality of focal planes for which a plurality of the first images is to be generated is determined, based on focal position information for respective positions in a screen of the plurality of signals output from the plurality of photoelectric converters.

23. A non-transitory computer-readable storage medium storing a program for causing a computer to execute a method of controlling an image capturing apparatus having an image sensor having a plurality of photoelectric converters each being configured to output a signal, wherein an image at a focal plane can be generated by performing realignment processing on a plurality of signals output from the plurality of photoelectric converters, and a processing unit configured to generate an image at a focal plane, the method comprising:
generating, by the processing unit, a first image, from the plurality of signals, at a focal plane at which a subject is detected; and
displaying the first image and a second image generated from the plurality of signals at a focal plane together,
wherein the first and second images include the subject, and
wherein, in the generating, a plurality of focal planes for which a plurality of the first images is to be generated is determined, based on focal position information for respective positions in a screen of the plurality of signals output from the plurality of photoelectric converters.

24. An image capturing apparatus comprising:
an image sensor having a plurality of photoelectric converters each being configured to output a signal, wherein an image at a focal plane can be generated, from a plurality of signals output from the plurality of photoelectric converters, by performing addition processing on signals output from corresponding photoelectric converters of the image sensor;
a processing unit configured to generate a first image, from the plurality of signals, at a focal plane at which a subject is detected; and
a display unit configured to display the first image and a second image generated from the plurality of signals at a focal plane together,
wherein the first and second images include the subject, and
wherein the processing unit determines a plurality of focal planes for which a plurality of the first images is to be generated, based on focal position information for respective positions in a screen of the plurality of signals output from the plurality of photoelectric converters.

25. A method of controlling an image capturing apparatus having an image sensor having a plurality of photoelectric converters each being configured to output a signal, wherein an image at a focal plane can be generated, from a plurality of signals output from the plurality of photoelectric converters, by performing addition processing on signals output from corresponding photoelectric converters of the image sensor, and a processing unit configured to generate an image at a focus plane, the method comprising:
generating, by the processing unit, a first image, from the plurality of signals, at a focal plane at which a subject is detected; and
displaying the first image and a second image generated from the plurality of signals at a focal plane together,
wherein the first and second images include the subject, and
wherein, in the generating, a plurality of focal planes for which a plurality of the first images is to be generated is determined, based on focal position information for respective positions in a screen of the plurality of signals output from the plurality of photoelectric converters.

26. A non-transitory computer-readable storage medium storing a program for causing a computer to execute a method of controlling an image capturing apparatus having an image sensor having a plurality of photoelectric converters each being configured to output a signal, wherein an image at a focal plane can be generated, from a plurality of signals output from the plurality of photoelectric converters, by performing addition processing on signals output from corresponding photoelectric converters of the image sensor, and a processing unit configured to generate an image at a focal plane, the method comprising:

generating, by the processing unit, a first image, from the plurality of signals, at a focal plane at which a subject is detected; and displaying the first image and a second image generated from the plurality of signals at a focal plane together, wherein the first and second images include the subject, and wherein, in the generating, a plurality of focal planes for which a plurality of the first images is to be generated is determined, based on focal position information for respective positions in a screen of the plurality of signals output from the plurality of photoelectric converters.

27. An image processing apparatus comprising:

an obtaining unit configured to obtain image data captured by an image sensor from which a reconstruction image at a set focal plane can be generated by performing refocus processing on the image data;

an image processing unit configured to generate a first reconstruction image from the image data at a focal plane at which a specific subject is in focus; and a display unit configured to display the first reconstruction image and a second reconstruction image generated from the image data at a focal plane together, wherein the first and second images include the specific subject, and wherein the image processing unit determines a plurality of focal planes for which a plurality of the first reconstruction images is to be generated, based on focal position information for respective positions in a screen of the image data output from the image sensor.

28. The image processing apparatus according to claim 27, wherein the first reconstruction image is recorded, as auxiliary information, in a reduced size, and the auxiliary information includes at least one position information indicating a position of a detected face in an image of the image data, and relative size information indicating a relative size of the face relative to the size of the image.

29. The image processing apparatus according to claim 27, wherein the display unit displays a thumbnail image of the second reconstruction image, and displays a face image that was clipped out of the first reconstruction image as auxiliary information,.

30. The image processing apparatus according to claim 27, further comprising a storing unit configured to store information that associates a facial feature and a name, wherein, in a case of determining that the subject appears, the image processing unit acquires a name that corresponds to the determined subject from the information stored in the storing unit, and the storing unit further records the acquired name as auxiliary information in association with the image data.

31. The image processing apparatus according to claim 30, wherein the display unit displays a thumbnail image of the second reconstruction image, and the name.

32. The image processing apparatus according to claim 27, further comprising a plurality of microlenses configured to be arranged between an imaging lens and the image sensor, each microlens corresponding to respective one of a plurality of regions of the image sensor, each region being composed of a predetermined number of pixels, wherein the image sensor is composed of a plurality of two-dimensionally arranged pixels, the image sensor being configured to perform photoelectric conversion on incident light and output the image data.

33. The image processing apparatus according to claim 27, wherein the image data captured from the image sensor is light field data.

34. The image processing apparatus according to claim 27, wherein the refocus processing includes realignment processing on pixels of the image data.

35. The image processing apparatus according to claim 27, wherein the refocus processing includes addition processing on output of corresponding photoelectric converters of the image sensor.

36. A method of controlling an image processing apparatus having an image sensor configured to capture image data from which a reconstruction image can be generated by performing refocus processing on the image data and a processing unit configured to generate a reconstruction image, the method comprising:

generating, by the processing unit, a first reconstruction image from the image data at a focal plane at which a specific subject is in focus; and displaying the first reconstruction image and a second reconstruction image generated from the image data at a focal plane together, wherein the first and second reconstruction images include the specific subject, and wherein, in the generating, a plurality of focal planes for which a plurality of the first reconstruction images is to be generated is determined, based on focal position information for respective positions in a screen of the image data output from the image sensor.

* * * * *